United States Patent
Robb et al.

(10) Patent No.: US 11,305,884 B2
(45) Date of Patent: Apr. 19, 2022

(54) ELECTRIC POWER AND DATA COMMUNICATIONS WITHIN A FUEL TANK AND ACROSS A WALL OF THE FUEL TANK USING RESISTIVE NON-METALLIC WIRE AND AN OPTICAL HYBRID FUEL HEIGHT SENSOR

(71) Applicant: The Boeing Company, Chicago, IL (US)

(72) Inventors: Andrew M. Robb, Seattle, WA (US); John Everett Groat, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/670,257

(22) Filed: Oct. 31, 2019

(65) Prior Publication Data

US 2020/0298990 A1 Sep. 24, 2020

Related U.S. Application Data

(60) Provisional application No. 62/820,328, filed on Mar. 19, 2019.

(51) Int. Cl.
*B64D 37/32* (2006.01)
*G01F 23/263* (2022.01)
(Continued)

(52) U.S. Cl.
CPC ............ *B64D 37/32* (2013.01); *B64D 37/02* (2013.01); *G01F 22/00* (2013.01); *G01F 23/266* (2013.01); *G01F 23/268* (2013.01); *G01F 23/80* (2022.01)

(58) Field of Classification Search
CPC ........ B64D 37/00; B64D 37/02; B64D 37/32; G01F 22/00; G01F 23/0061; G01F 23/266; G01F 23/268
See application file for complete search history.

(56) References Cited

U.S. PATENT DOCUMENTS 4,253,332 A * 3/1981 Sabatino ................... G01F 3/38
73/224
4,987,776 A * 1/1991 Koon ..................... G01F 23/266
73/304 C (Continued)

FOREIGN PATENT DOCUMENTS

CN 104372281 A 2/2015

OTHER PUBLICATIONS

European Extended Search Report dated Jul. 24, 2020 for European Patent Application No. 20161822.0, 7 pages.

*Primary Examiner* — Francis C Gray
(74) *Attorney, Agent, or Firm* — Sage Patent Group

(57) ABSTRACT

A system for power and data communications within a fuel tank and across a wall of the fuel tank includes an optical hybrid fuel height sensor and a sealed connector extending through a wall of the fuel tank. The system also includes an electric power connection between the optical hybrid fuel height sensor and the sealed connector. The electric power connection includes a resistive non-metallic wire. The system also includes a sealed optical connector extending through the wall of the fuel tank. The system further includes an internal data communications connection between the optical hybrid fuel height sensor and the sealed optical connector. The internal data communications connection includes an optical signal out connection.

22 Claims, 18 Drawing Sheets

(51) Int. Cl.
*B64D 37/02* (2006.01)
*G01F 22/00* (2006.01)
*G01F 23/80* (2022.01)

(56) References Cited

U.S. PATENT DOCUMENTS

| | | | | |
|---|---|---|---|---|
| 5,560,340 | A | * | 10/1996 | Tomisawa .............. F02M 69/54 |
| | | | | 123/494 |
| 5,814,830 | A | * | 9/1998 | Crowne ................. G01F 23/80 |
| | | | | 340/623 |
| 6,164,266 | A | * | 12/2000 | Just ...................... H01F 41/127 |
| | | | | 29/608 |
| 8,281,655 | B2 | | 10/2012 | Bahorich et al. |
| 9,299,471 | B1 | | 3/2016 | Robb |
| 10,564,022 | B2 | | 2/2020 | Olson |
| 10,641,645 | B2 | | 5/2020 | Bellinger et al. |
| 10,754,101 | B1 | * | 8/2020 | Chan ................... G02B 6/3834 |
| 2002/0065582 | A1 | * | 5/2002 | Morrison ............. G01F 23/802 |
| | | | | 700/286 |
| 2004/0079150 | A1 | * | 4/2004 | Breed ................... G01F 23/20 |
| | | | | 73/299 |
| 2004/0187614 | A1 | | 9/2004 | Atmur |
| 2007/0127521 | A1 | | 6/2007 | Sandell et al. |
| 2007/0129902 | A1 | | 6/2007 | Orbell |
| 2014/0331763 | A1 | * | 11/2014 | Robb ................... G01F 23/266 |
| | | | | 73/304 C |
| 2017/0363049 | A1 | | 12/2017 | Yoon et al. |
| 2018/0299312 | A1 | | 10/2018 | Olson |
| 2019/0204135 | A1 | | 7/2019 | Lee et al. |
| 2020/0298989 | A1 | | 9/2020 | Robb |
| 2020/0298991 | A1 | | 9/2020 | Robb |
| 2020/0326224 | A1 | * | 10/2020 | Chan ................... G01F 23/2925 |

* cited by examiner

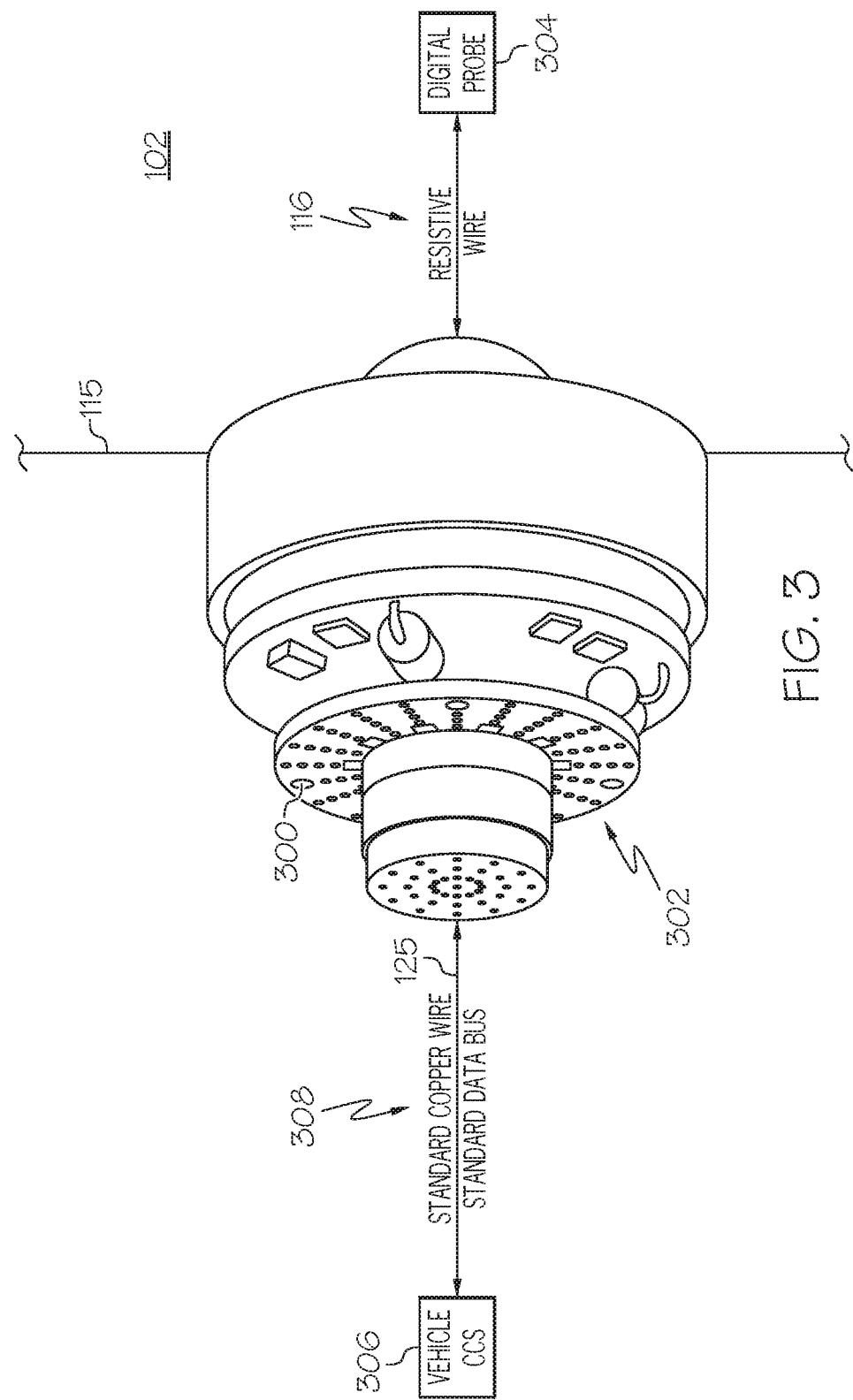

ELECTRIC POWER AND DATA COMMUNICATIONS WITHIN A FUEL TANK AND ACROSS A WALL OF THE FUEL TANK USING RESISTIVE NON-METALLIC WIRE AND AN OPTICAL HYBRID FUEL HEIGHT SENSOR

CROSS-REFERENCE TO RELATED APPLICATIONS

This application claims the benefit of priority of U.S. Provisional Application No. 62/820,328, filed Mar. 19, 2019 which is incorporated herein by reference in its entirety.

This application is related to U.S. patent application Ser. No. 16/670,229, entitled "Electric Power and Data Communications within a Fuel Tank and across a Wall of the Fuel Tank Using Resistive Non-Metallic Wire," filed the same date as the present application and incorporated herein by reference.

This application is also related to U.S. patent application Ser. No. 16/670,286, entitled "Electric Power and Data Communications within a Fuel Tank and across a Wall of the Fuel Tank Using Resistive Non-Metallic Wire and a Sealed Active Connector," filed the same date as the present application and incorporated herein by reference.

FIELD

The present disclosure relates generally to vehicles, such as aircraft, and more particularly to electric power and data communications within a fuel tank and across a wall of the fuel tank using resistive non-metallic wire and optical hybrid fuel height sensor.

BACKGROUND

Installation of electrically conductive materials in a fuel tank requires significant design detail and consideration to minimize a possibility of an electrical discharge within the fuel tank. Historically, non-metallic conductors such as carbon loaded plastics and foams have been widely used for shielding and anti-static applications. When exposed to transient electric fields these materials are resistant to the high current flows and sparks that would ignite fuels. Additionally, accurate and dependable measurements of the quantity of fuel in the tanks needs to be made.

SUMMARY

In accordance with an embodiment, a system includes an optical hybrid fuel height sensor and a sealed connector extending through a wall of a fuel tank. The system also includes an electric power connection between the optical hybrid fuel height sensor and the sealed connector, wherein the electric power connection includes a resistive non-metallic wire. The system also includes a sealed optical connector extending through the wall of the fuel tank. The system further includes an internal data communications connection between the optical hybrid fuel height sensor and the sealed optical connector. The internal data communications connection includes an optical signal out connection.

In accordance with another embodiment, a vehicle includes a fuel tank and a power and data communications system within the fuel tank. The power and data communications system includes an optical hybrid fuel height sensor and a sealed connector extending through a wall of the fuel tank. The power and data communications system also includes an electric power connection between the optical hybrid fuel height sensor and the sealed connector, wherein the electric power connection comprises a resistive non-metallic wire. The power and data communications system additionally includes a sealed optical connector extending through the wall of the fuel tank. The power and data communications system further includes an internal data communications connection between the optical hybrid fuel height sensor and the sealed optical connector. The internal data communications connection includes an optical signal out connection.

In accordance with another embodiment, a method includes inserting one or more optical hybrid fuel height sensors in a fuel tank and providing an electric power connection between each optical hybrid fuel height sensor and a sealed connector extending through a wall of the fuel tank. The method also includes providing a sealed optical connector extending through the wall of the fuel tank and providing an internal data communications connection between each optical hybrid fuel height sensor and the sealed optical connector. The internal data communications connection includes an optical signal out connection.

In accordance with an embodiment and any of the preceding embodiments, wherein the resistive non-metallic wire includes a carbon loaded thermoplastic.

In accordance with an embodiment and any of the preceding embodiments, wherein the resistive non-metallic wire includes a carbon loaded polyether ether ketone (PEEK) thermoplastic.

In accordance with an embodiment and any of the preceding embodiments, wherein the resistive non-metallic wire includes a resistance between about 100 ohms/meter and about 1 Mohms/meter.

In accordance with an embodiment and any of the preceding embodiments, wherein the optical hybrid fuel height sensor includes an optical transmitter configured to convert fuel height electrical signals to fuel height optical signals.

In accordance with an embodiment and any of the preceding embodiments, wherein the internal data communications connection includes an optical fiber that couples the optical transmitter and the sealed optical connector.

In accordance with an embodiment and any of the preceding embodiments, wherein the sealed optical connector includes an optical connector disposed within the sealed connector and the optical connector connects the internal data communications connection to an external data communications connection.

In accordance with an embodiment and any of the preceding embodiments, wherein the sealed optical connector includes a dedicated sealed optical connector that is separate from the sealed connector and connects the internal data communications connection to an external data communications connection.

In accordance with an embodiment and any of the preceding embodiments, wherein the sealed optical connector includes an optical fiber that extends intact through the wall of the fuel tank and between the optical transmitter and an optical data converter, or a data concentrator, outside the fuel tank.

In accordance with an embodiment and any of the preceding embodiments, further including an external data communications connection outside the fuel tank between the sealed optical connector and a device of a core computer system (CCS).

In accordance with an embodiment and any of the preceding embodiments, wherein the external data communications connection includes an optical data converter connected between the sealed optical connector and the CCS, the optical data converter being configured to convert optical signals to electrical signals for transmission on a conductive metal wire to the CCS.

In accordance with an embodiment and any of the preceding embodiments, wherein the external data communications connection includes a data concentrator connected between the sealed optical connector and the CCS, the data concentrator being configured to read a multitude of fiber optic signals and transmit a single stream of data to the CCS.

In accordance with an embodiment and any of the preceding embodiments, wherein the electric power connection includes a two-wire electric power connection.

In accordance with an embodiment and any of the preceding embodiments, wherein the electric power connection includes a one-wire electric power connection and a current return through a local ground connection of the optical hybrid fuel height sensor.

In accordance with an embodiment and any of the preceding embodiments, wherein the optical hybrid fuel height sensor includes a fuel height probe and the fuel height probe comprises a local electric ground connection.

In accordance with an embodiment and any of the preceding embodiments, wherein the optical hybrid fuel height sensor includes a floating fuel height probe without an electric ground connection.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 3 is an illustration of an example of a connector including an internal electronic circuit in accordance with an embodiment of the present disclosure.

DETAILED DESCRIPTION

Figure 1A:
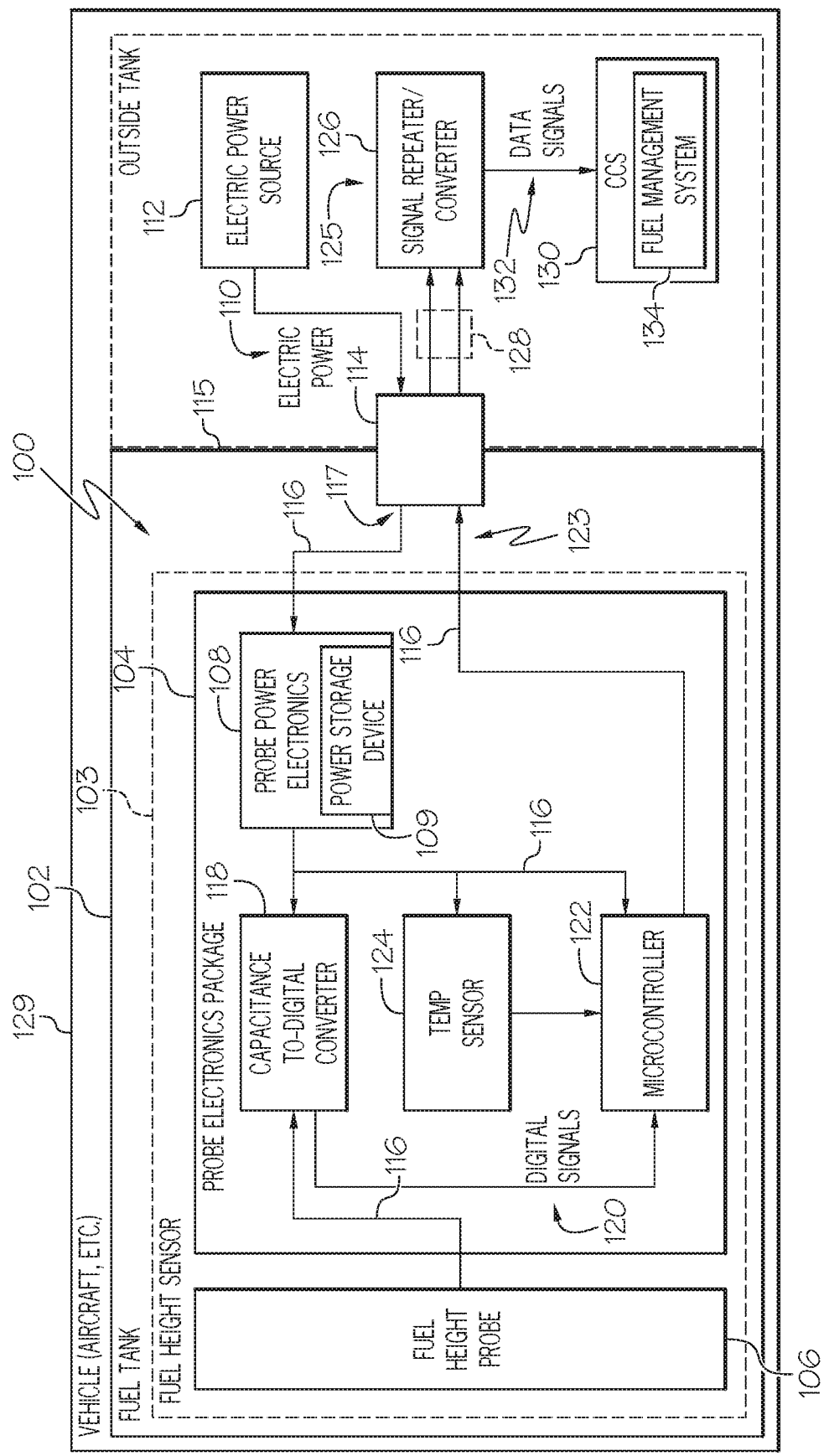
FIG. 1A is a block schematic diagram of an example of a system for electric power and data communications within a fuel tank and across a wall of the fuel tank in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 2B:
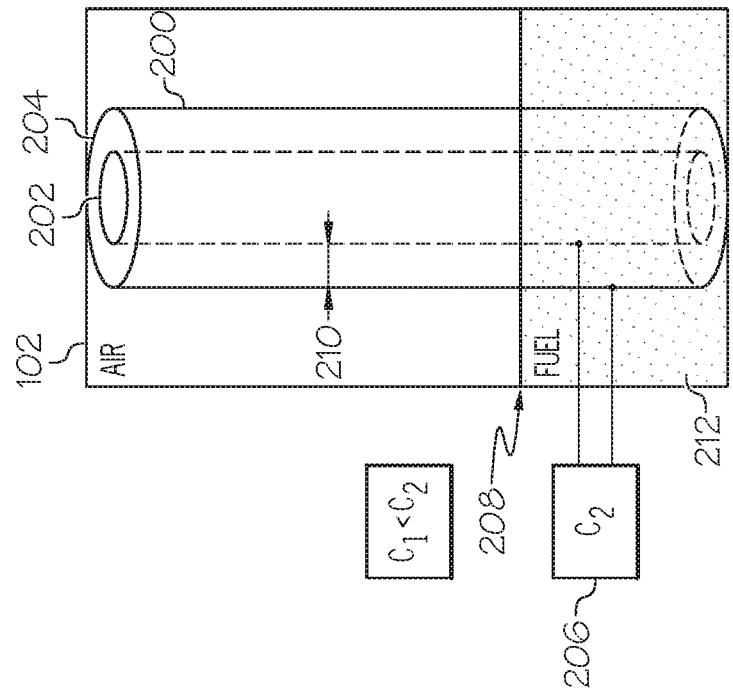
FIGS. 2A and 2B are an illustration of an example of a fuel height to capacitance probe in accordance with an embodiment of the present disclosure.
Figure 2A:
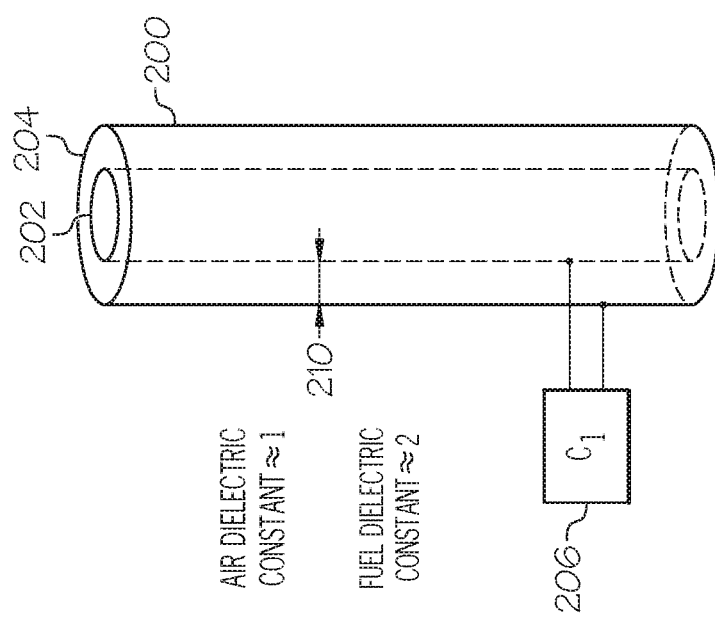
Figure 4:
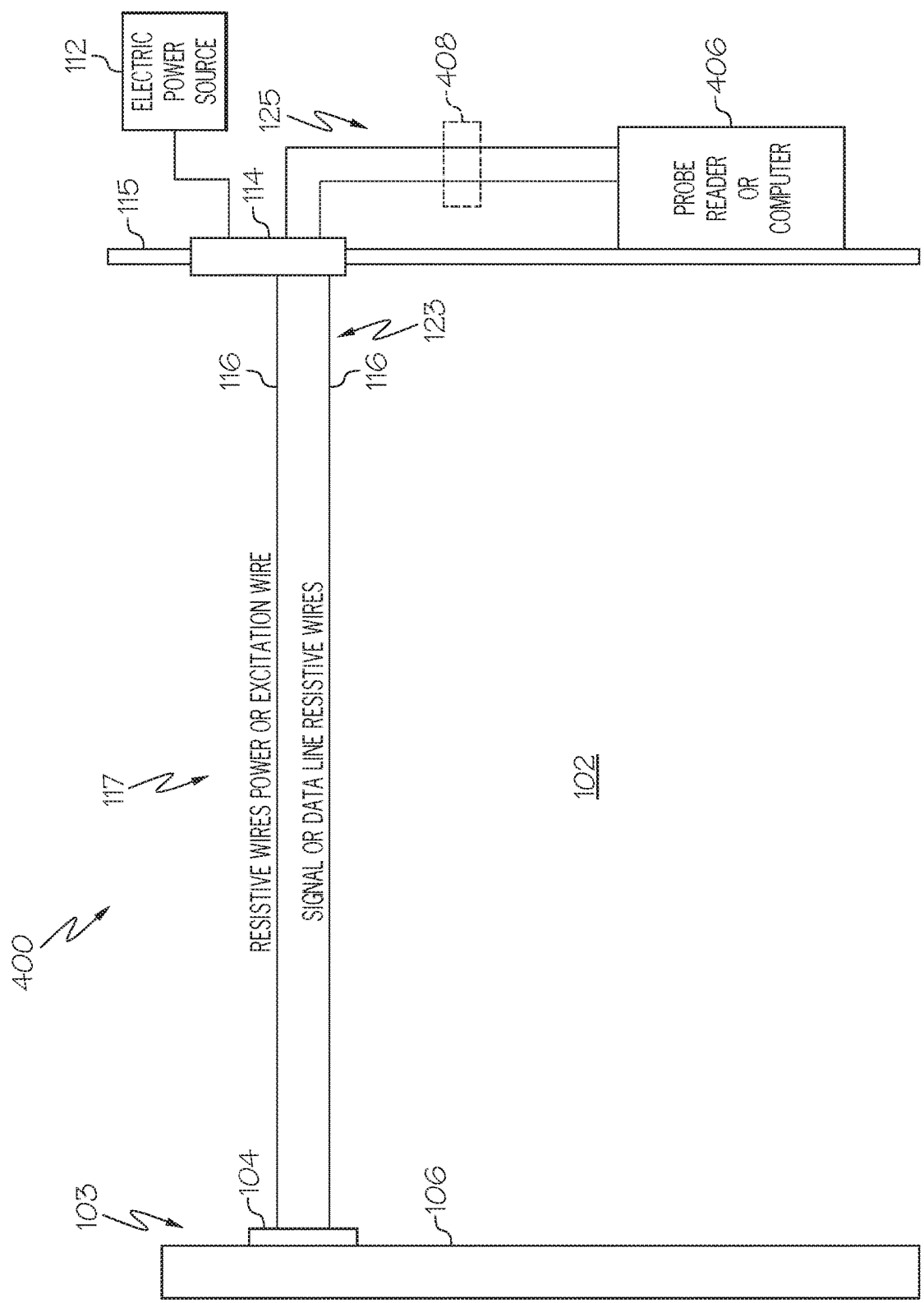
FIGS. 4-11 are examples of different electric power and data communications configurations for a fuel tank in accordance with different embodiments of the present disclosure.

FIG. 1A is a block schematic diagram of an example of a system 100 for electric power and data communications within a fuel tank 102 and across a wall 115 of the fuel tank 102 in accordance with an embodiment of the present disclosure. In the example of FIG. 1A, the system 100 in onboard a vehicle 129, for example, an aircraft. The system 100 includes one or more fuel height sensors 103 disposed within the fuel tank 102 and at different locations within the fuel tank to accurately measure a quantity of fuel in the fuel tank 102. Each fuel height sensor 103 includes a probe electronics package 104 and a fuel height probe 106. In accordance with an embodiment, the fuel height probe 106 is a fuel height to capacitance probe, for example, fuel height to capacitance probe 200 illustrated in FIG. 2. Referring also to FIG. 2, FIG. 2 is an illustration of an example of a fuel height to capacitance probe 200 in accordance with an embodiment of the present disclosure. The fuel height to capacitance probe 200 includes two concentric tubes 202 and 204. The fuel height 208 is measured by measuring the capacitance 206 between the concentric tubes 202 and 204 placed in the fuel tank 102. The spacing 210 between the tubes 202 and 204 is carefully controlled, and because the dielectric constant of fuel is approximately twice that of air, changes in the fuel height 208 can be read by changes in the capacitance 206 measured between the tubes 202 and 204. From the fuel height 208 reading given by the fuel height to capacitance probe 200, the volume of fuel in the fuel tank 102 can be determined, and ultimately, the weight of the fuel 212 is calculated based on the density of the fuel 212 by a device 406 (FIG. 4). In accordance with an embodiment, for example the embodiment in FIG. 4, examples of the device 406 include, but are not necessarily limited to, a probe reader, a computer or other device. In the exemplary embodiment in FIG. 1A, the fuel weight is calculated by a core computer system (CCS) 130. The CCS 130 receives data from multiple fuel height sensors 103 and data from a fuel density measurement to calculate total fuel weight on a vehicle 129. The fuel weight is reported to a flight crew and/or a ground servicing crew in the example of the system 100 being onboard an aircraft.

The probe electronics package 104 includes probe power electronics 108. The probe power electronics 108 receive electric power 110 from an electric power source 112 located outside the fuel tank 102. The probe power electronics 108 include filters and provide stable electric power to oscillators and other components of the probe electronics package 104. In accordance with an embodiment, the probe power electronics 108 also includes a power storage device 109, such as a capacitor, to provide any additional power for increased power requirements during fuel height measurement and/or communications. In another embodiment, the power storage device 109 is a separate component from the probe power electronics 108.

A sealed connector 114 extends through a wall 115 of the fuel tank 102. An electric power connection 117 between the sealed connector 114 and the fuel height sensor 103 provides electric power 110 from the electric power source 112 outside the fuel tank 102 to the fuel height sensor 103. The electric power connection 117 includes a resistive non-metallic wire 116. The sealed connector 114 is configured for connecting components of the probe electronics package 104 within the fuel tank 102 to elements outside the fuel tank 102, such as the electric power source 112 and other devices for determining the quantity of fuel in the fuel tank 102. The sealed connector 114 is electrically connected to the probe power electronics 108 within the fuel tank 102 by the resistive non-metallic wire 116. In accordance with an embodiment, at the sealed connector 114, the electric power and communications signals transition to metallic wiring outside of the fuel tank 102. In accordance with an embodiment, the resistive non-metallic wire 116 is a carbon loaded thermoplastic. In an example, the resistive non-metallic wire 116 is a carbon loaded polyether ether ketone (PEEK) thermoplastic. The resistive non-metallic wire 116 includes a resistance between about 100 ohms/meter and about 1 Mega-ohms/meter. Components of the fuel height sensor 103 and probe electronics package 104 are interconnected as illustrated in the example in FIG. 1A by resistive non-metallic wire 116.

Referring also to FIG. 3, FIG. 3 is an illustration of an example of a sealed connector 300 including an internal electronic circuit 302 in accordance with an embodiment of the present disclosure. In accordance with the example in FIG. 3, the sealed connector 300 is used for the sealed connector 114 in the example in FIG. 1A. The sealed connector 300 is an active sealed connector that communicates over resistive non-metallic wire 116 to one or more digital probes 304 within the fuel tank 102. Signals propagating over high resistance wire have a high source impedance and require a high impedance active receiver to translate those signals to those signals typically used on copper wiring. In accordance with an embodiment, each digital probe 304 includes the fuel height sensor 103 in FIG. 1A. In the example in FIG. 3, the sealed connector 300 is connected to a vehicle core computer system (CSS) 306 by an external data communications connection 125. In accordance with an example, the external data communications connection 125 uses standard copper wire data buses 308. The internal electronic circuit 302 of the sealed connector 300 reads digital data from the digital probe 304 via the resistive non-metallic wire 116. The sealed connector 300 transmits the digital data onto the data bus 308, for example, an aircraft data bus, such as a standard copper wire Aeronautical Radio, Incorporated (ARINC) bus, Controller Area Network (CAN) bus or canbus or mil-std-1553 data bus. At the digital probe 304 the changing fuel level changes the capacitance which is then read by a capacitance-to-digital converter, for example, capacitance-to-digital converter 118 in FIG. 1A and sent to a microcontroller 122. The microcontroller 122 adds the probe ID number and formats the data packet then transmits the data packet over an internal data communications connection 123 between the fuel height sensor 103 and the sealed connector 114 in FIG. 1A or 300 in FIG. 3. The internal data communications connection 123 includes a resistive non-metallic wire 116.

In accordance with an embodiment, the active sealed connector 300 reads probe data packets from multiple digital probes 304. For example, about eight to about twelve digital probes 304 are connect to a single sealed connector 300 via resistive non-metallic wire 116. The sealed connector 300 collects the probe data from the multiple digital probes 304, formats the probe data into standard aircraft data bus packets and communicates the probe data directly to the vehicle CCS 306. At the vehicle CCS 306, the data bus packets are read so that the vehicle CCS 306 now knows the fuel height at each digital probe 304. A software program, for example fuel management system 134 in FIG. 1A, within the vehicle CCS 306 then looks at height/volume relationship tables, for example, curves of fuel probe levels vs volume, and calculates the total volume of fuel. Combining that data with a measure or estimate of fuel density provides total weight of fuel in each instrumented fuel tank 102 of the vehicle 129 or aircraft. This information is provided to and/or accessed by one or more different components of the vehicle 129 or aircraft, for example, the cockpit of an aircraft, refuel panel, diagnostics, etc. Once the CCS 306 software module has calculated total fuel weight, the total fuel weight can be transmitted to whatever application on the aircraft needs this information.

Referring back to FIG. 1A, the probe electronics package 104 also includes a capacitance-to-digital converter 118. The fuel height probe 106 is directly connected to the probe electronics package 104 that includes the capacitance-to-digital converter 118. The resistive non-metallic wire 116 runs from the probe electronics package 104 to the sealed connector 114. An example of the capacitance-to-digital converter 118 is an FDC1004 provided by Texas Instruments, Incorporated. The capacitance-to-digital converter 118 receives capacitance data from the fuel height probe 106 and converts the capacitance data to a digital signal 120. In the example in FIG. 1A, the probe electronics package 104 also includes a microcontroller 122 and a temperature sensor 124. The microcontroller 122 receives temperature measurements from the temperature sensor 124 and receives digital signals 120 corresponding to the fuel height 208 (FIG. 2) from the capacitance-to-digital converter 118. The temperature sensor 124 is a digital or analog temperature sensor. The temperature sensor 124 and the capacitance to digital converter 118 are connected to the microcontroller 122. The capacitance-to-digital converter 118, temperature sensor 124 and the microcontroller 122 receive electric power from the probe power electronics 108. In accordance with the example illustrated in FIG. 1A, the microcontroller 122 of the probe electronics package 104 is electrically connected to the sealed connector 114 by resistive non-metallic wire 116.

In accordance with an embodiment, the system 100 also includes an external data communications connection 125 outside the fuel tank 102. In accordance with the example in FIG. 1A, the external data communications connection 125 includes a signal repeater/converter 126 outside the fuel tank 102. The external data communications connection 125 also includes copper wires 128 that electrically connect the signal repeater/converter 126 to the sealed connector 114. The signal repeater/converter 126 receives data signals from the microcontroller 122 containing data indicative of a quantity of fuel 212 (FIG. 2) within the fuel tank 102.

In accordance with another embodiment, a data concentrator replaces the signal repeater/converter 126 to receive data signals from the microcontroller 122 via the sealed connector 114.

In the example in FIG. 1A, a core computer system (CCS) 130 receives digital signals 132 including fuel height data from the signal repeater/converter 126. The CCS 130 includes a fuel management system 134 configured to determine at least a quantity of fuel 212 in the fuel tank 102. In accordance with example, the signal repeater/converter 126 is a data concentrator. The data concentrator includes an output configured to transmit data based on the fuel height data received from the fuel height sensor 103 or sensors to the fuel management system 134 embodied on the core computer system 130. The core computer system 130 is configured to convey a fuel quantity indication based on the fuel height data received from the fuel height sensor 103 or sensors.

Figure 1B:
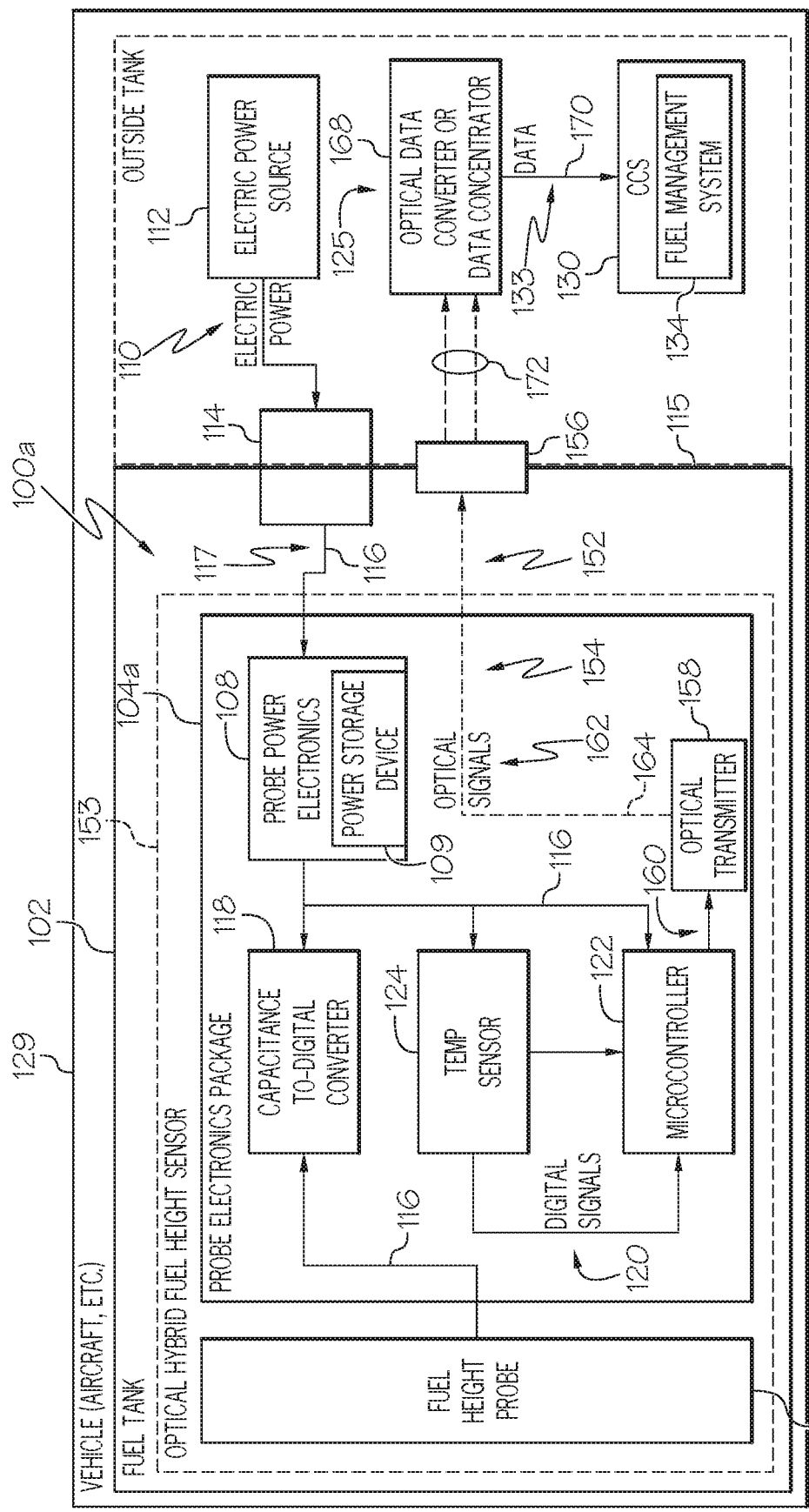
FIG. 1B is a block schematic diagram of another example of a system for electric power and data communications within a fuel tank and across a wall of the fuel tank in accordance with another embodiment of the present disclosure.

FIG. 1B is a block schematic diagram of an example of another system 100a onboard a vehicle 129 for electric power and data communications within a fuel tank 102 and across a wall 115 of the fuel tank 102 in accordance with another embodiment of the present disclosure. The other system 100a is the same as the system 100 in FIG. 1A except the system 100a includes an internal data communications connection 152 within the fuel tank 102 that includes an optical hybrid fuel height sensor 153 and an optical signal out connection 154 between the optical hybrid fuel height sensor 153 and a sealed optical connector 156. The sealed optical connector 156 extends through the wall 115 of the fuel tank 102.

The optical hybrid fuel height sensor 153 is similar to the fuel height sensor 103 in FIG. 1A except the optical hybrid fuel height sensor 153 includes an optical transmitter 158 in the probe electronics package 104a. The optical transmitter 158 is configured to convert fuel height electrical signals 160 from the microcontroller 122 to fuel height optical signals 162. The internal data communications connection 152 includes an optical fiber 164 between the optical transmitter 158 and the sealed optical connector 156. In accordance with the embodiment in FIG. 1B, the sealed optical connector 156 is a dedicated sealed optical connector 156 that is separate from the sealed connector 114 and connects the internal data communications connection 152 to an external data communications connection 125.

The system 100a also included an external data communications connection 125 outside the fuel tank 102 between the sealed optical connector 156 or optical connector 166 (FIG. 1C) and a core computer system (CCS) 130. As previously described, the CCS 130 includes a fuel management system 134 configured to determine at least a quantity of fuel 212 in the fuel tank 102. The external data communications connection 125 includes an optical data converter 168 connected between the sealed optical connector 156 and the CCS 130. The optical data converter 168 is configured to convert optical signals 162 to electrical digital signals 132 for transmission on a conductive metal wire 170 to the CCS 130.

In accordance with another embodiment, the external data communications connection 125 includes a data concentrator connected between the sealed optical connector 156 and the CCS 130. Accordingly, the optical data converter 168 is replaced by a data concentrator. The data concentrator is configured to read a multitude of fiber optic signals 172 and transmit a single stream of data 133 to the CCS 130.

Figure 1C:
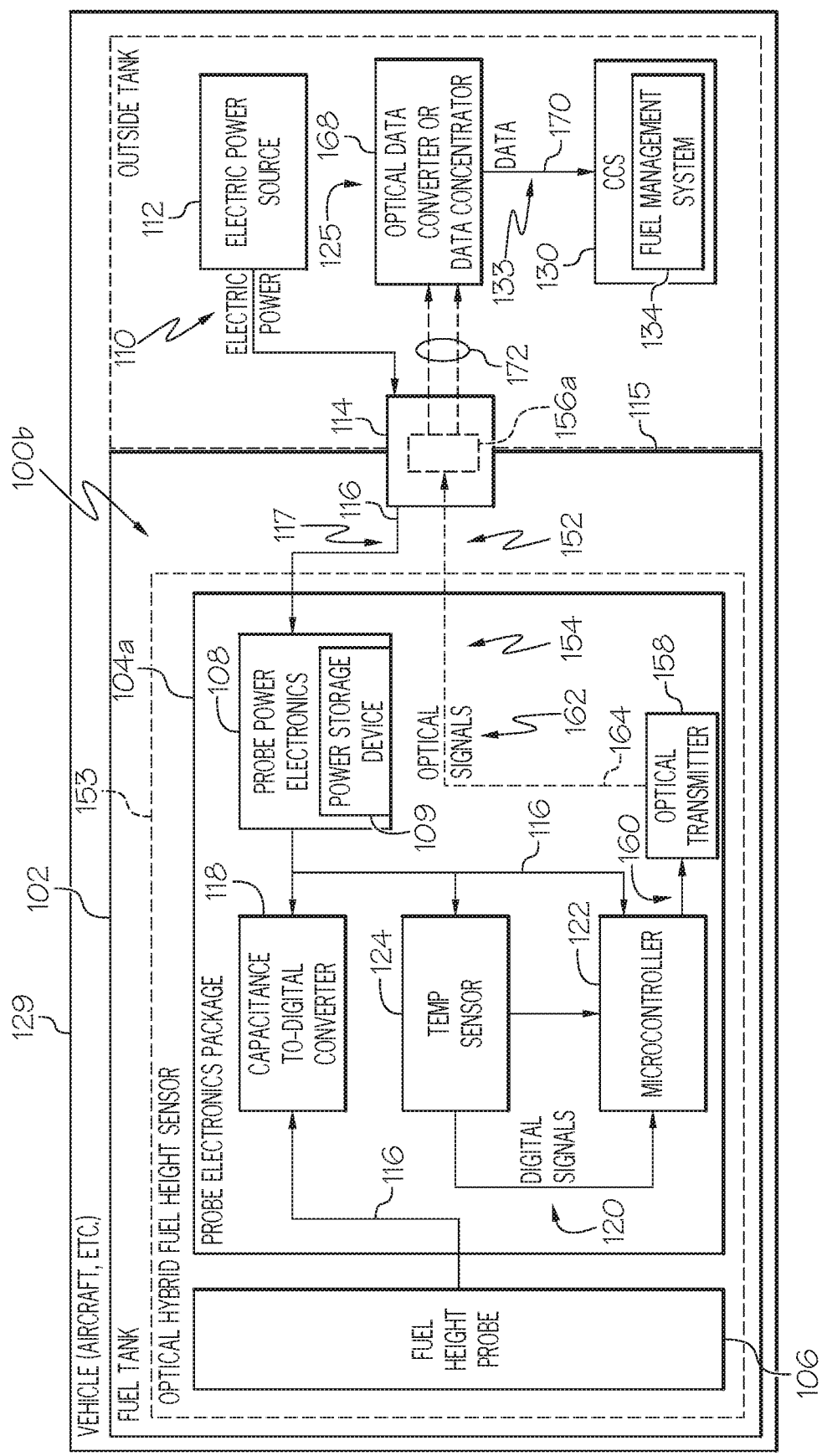
FIG. 1C is a block schematic diagram of another example of a system for electric power and data communications within a fuel tank and across a wall of the fuel tank in accordance with a further embodiment of the present disclosure.

FIG. 1C is a block schematic diagram of an example of another system 100b for electric power and data communications within a fuel tank 102 and across a wall 115 of the fuel tank 102 in accordance with further embodiment of the present disclosure. The exemplary system 100b illustrated in FIG. 1C is the same as the system 100a in FIG. 1B except the sealed optical connector 156 is an optical connector 156a disposed within the sealed connector 114. The optical connector 156a connects the internal data communications connection 152 to the external data communications connection 125.

In accordance with a further embodiment, the sealed optical connector 156 includes the optical fiber 164 extending intact through the wall 115 of the fuel tank 102 and between the optical transmitter 158 and an optical data converter 168 outside the fuel tank 102. The penetration of the optical fiber 164 through the wall 115 is sealed to prevent any leakage from the tank.

FIGS. 4-11 are examples of different electric power and data communications configurations for a fuel tank 102 in accordance with different embodiments of the present disclosure. FIG. 4 is an electric power and data communications configuration 400 including an electric power connection 117 and an internal data communications connection 123, each coupled between the sealed connector 114 and the probe electronics package 104. The electric power connection 117 and the internal data communications connection 123 both include resistive non-metallic wires 116 similar to that previously described. A device 406, for example, a probe reader, computer, etc. outside the fuel tank 102 is electrically connected to the sealed connector 114 by an external data communications connection 125. In accordance with the example illustrated in FIG. 4, the external data communications connection 125 includes cooper wires 408.

Figure 5:
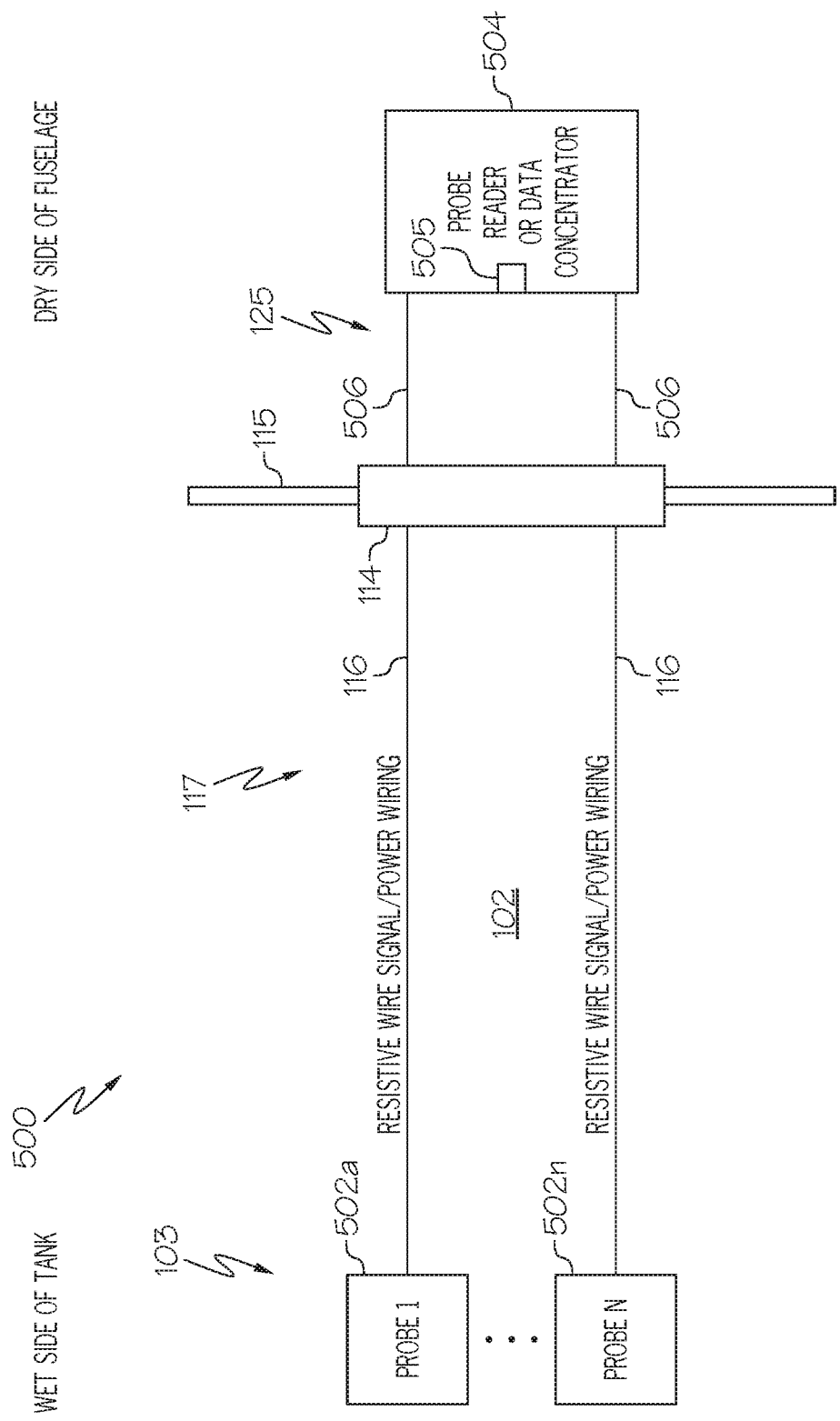

FIG. 5 illustrates an example of an electric power and data communications connection 500 including a plurality of probes 502a-502n within a fuel tank 102. In accordance with an embodiment, each of the plurality of probes 502a-502n is a fuel height sensor 103 similar to that described with reference to FIG. 1A. Each of the probes 502a and 502n are connected to a sealed connector 114 by a resistive non-metallic wire 116 for both electric power and data communications within the fuel tank 102. In accordance with an embodiment, a probe reader 504 receives data signals from the probes 502a-502n via the sealed connector 114. In another embodiment, the probe reader 504 is replaced by a data concentrator suitable for receiving high source impedance signals. The data concentrator includes an interface 505 configured to receive data from a system, such as system 100 for electric power and data communications within a fuel tank 102 and across a wall 115 of the fuel tank 102. The probe reader 504 or data concentrator is electrically connected to the sealed connector 114 by an external data communications connection 125. In accordance with an example, the external data communications connection 125 includes copper wires 506.

Figure 6:
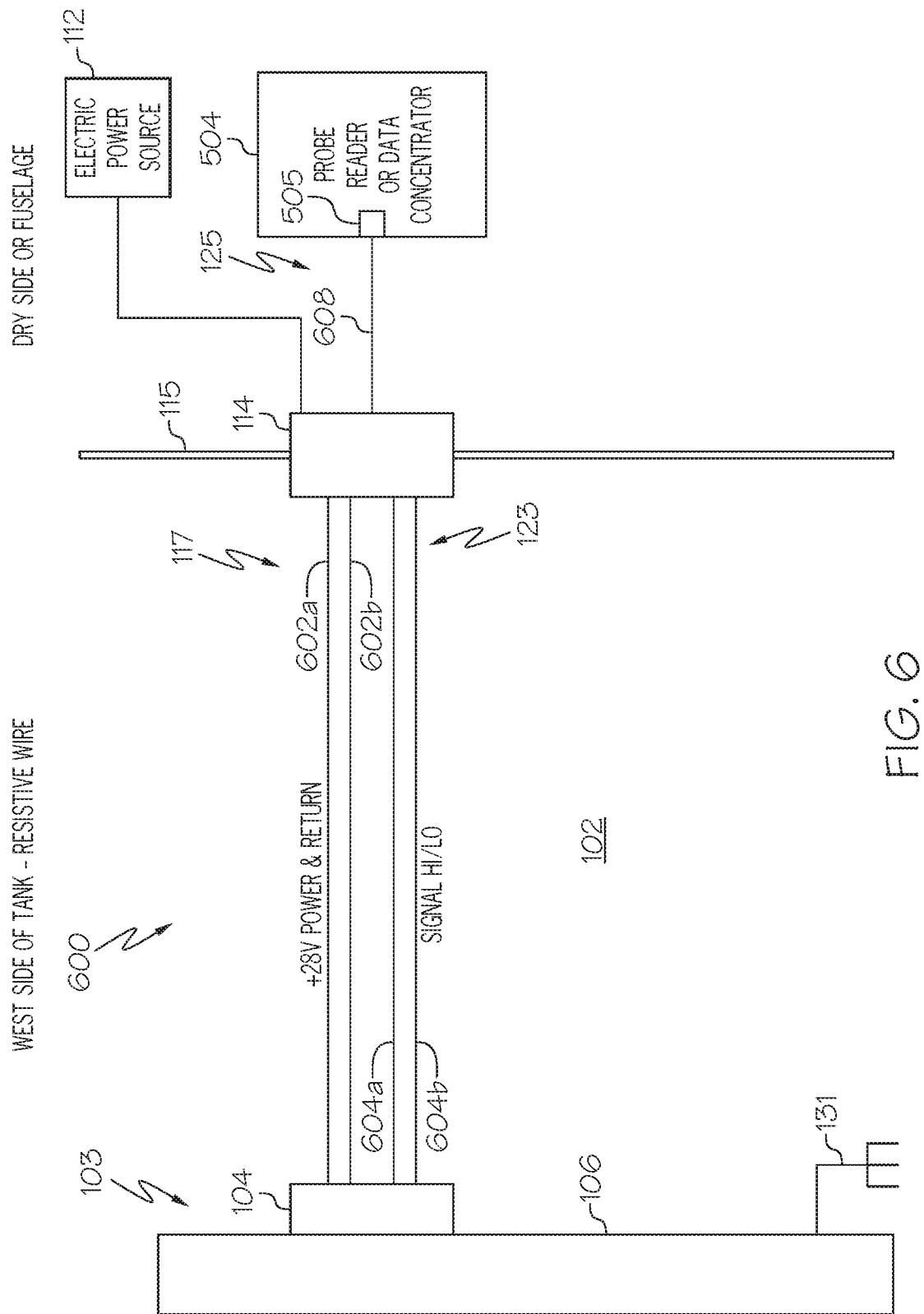

FIG. 6 illustrates an example of a four wire architecture 600 including a fuel height probe 106 with a local electric ground connection 131. An electric power connection 117 within the fuel tank 102 includes a power resistive non-metallic wire 602a and a return power resistive non-metallic wire 602b connecting the probe electronics package 104 to the sealed connector 114. The power resistive non-metallic wire 602a and the return power resistive non-metallic wire 602b define a two-wire electric power connection 602a and 602b An internal data communications connection 123 within the fuel tank 102 includes a signal Hi resistive non-metallic wire 604a and a signal Lo resistive non-metallic wire 604b connecting the probe electronics package 104 to the sealed connector 114. The resistive non-metallic wires 602a, 602b, 604a and 604b are the same as resistive non-metallic wires 116 in FIG. 1A. The sealed connector 114 is electrically connected to a probe reader 504 by an external data communications connection 125. In accordance with an example, the external data communications connection 125 includes a copper bundle 608. In another embodiment, the probe reader 504 is replaced by a data concentrator.

Figure 7:
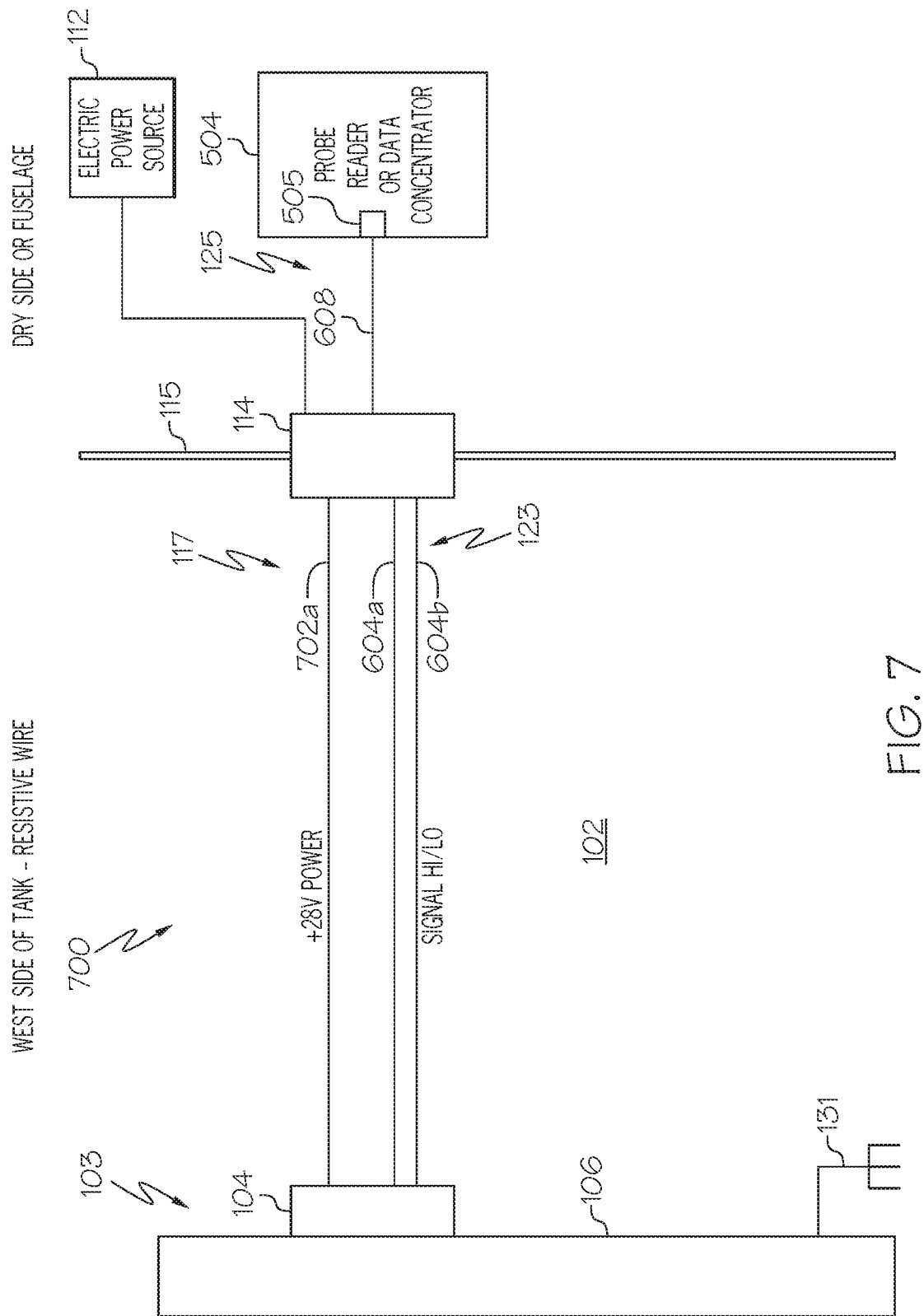

FIG. 7 illustrates an example of a four wire architecture 700 including a fuel height probe 106 with a local electric ground connection 131 and local power return. The local electric ground connection 131 provides an electric current return path via a structural ground rather than a wire return path as illustrated in the example in FIG. 6. An electric power connection 117 within the fuel tank 102 includes a single power resistive non-metallic wire 702a connecting the probe electronics package 104 to the sealed connector 114. An internal data communications connection 123 within the fuel tank 102 includes a signal Hi resistive non-metallic wire 604a and a signal Lo resistive non-metallic wire 604b connecting the probe electronics package 104 to the sealed connector 114. The resistive non-metallic wires 702a, 604a and 604b are the same as resistive non-metallic wires 116 in FIG. 1A. The sealed connector 114 is electrically connected to a probe reader 504 outside the fuel tank 102 by an external data communications connection 125. In accordance with an example, the external data communications connection 125 includes a copper bundle 608. In another embodiment, the probe reader 504 is replaced by a data concentrator.

Figure 8:
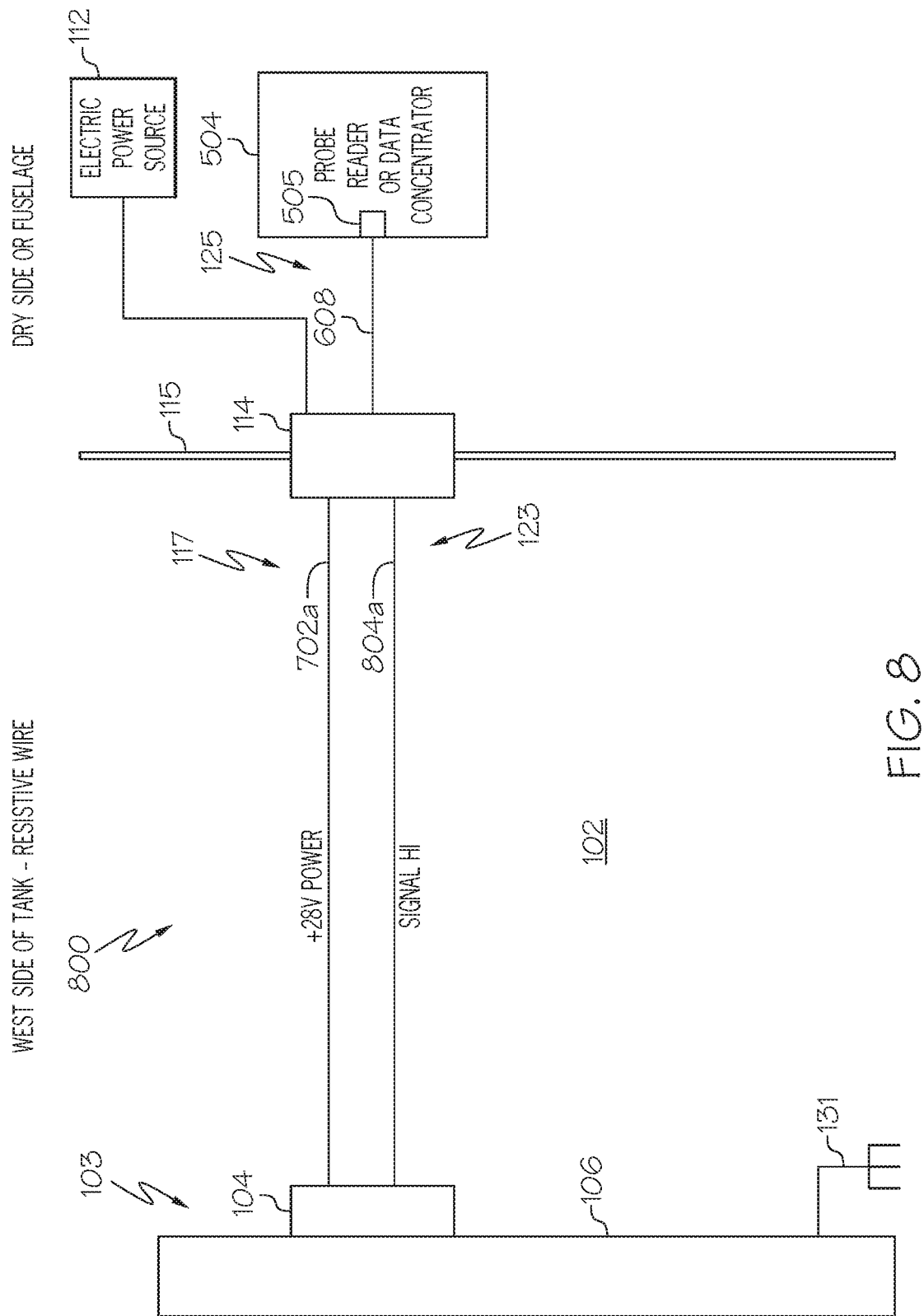

FIG. 8 illustrates an example of a four wire architecture 800 including a fuel height probe 106 with a local electric ground connection 131, a local power return and a local data signal return. An electric power connection 117 within the fuel tank 102 includes a single power resistive non-metallic wire 702a connecting the probe electronics package 104 to the sealed connector 114. An internal data communications connection 123 within the fuel tank 102 includes a single signal Hi resistive non-metallic wire 804a connecting the probe electronics package 104 to the sealed connector 114. The resistive non-metallic wires 702a and 804a are the same as resistive non-metallic wires 116 in FIG. 1A. The sealed connector 114 is electrically connected to a probe reader 504 outside the fuel tank 102 by an external data communications connection 125. In accordance with an example, the external data communications connection 125 includes a copper bundle 608. In another embodiment, the probe reader 504 is replaced by a data concentrator.

Figure 9:
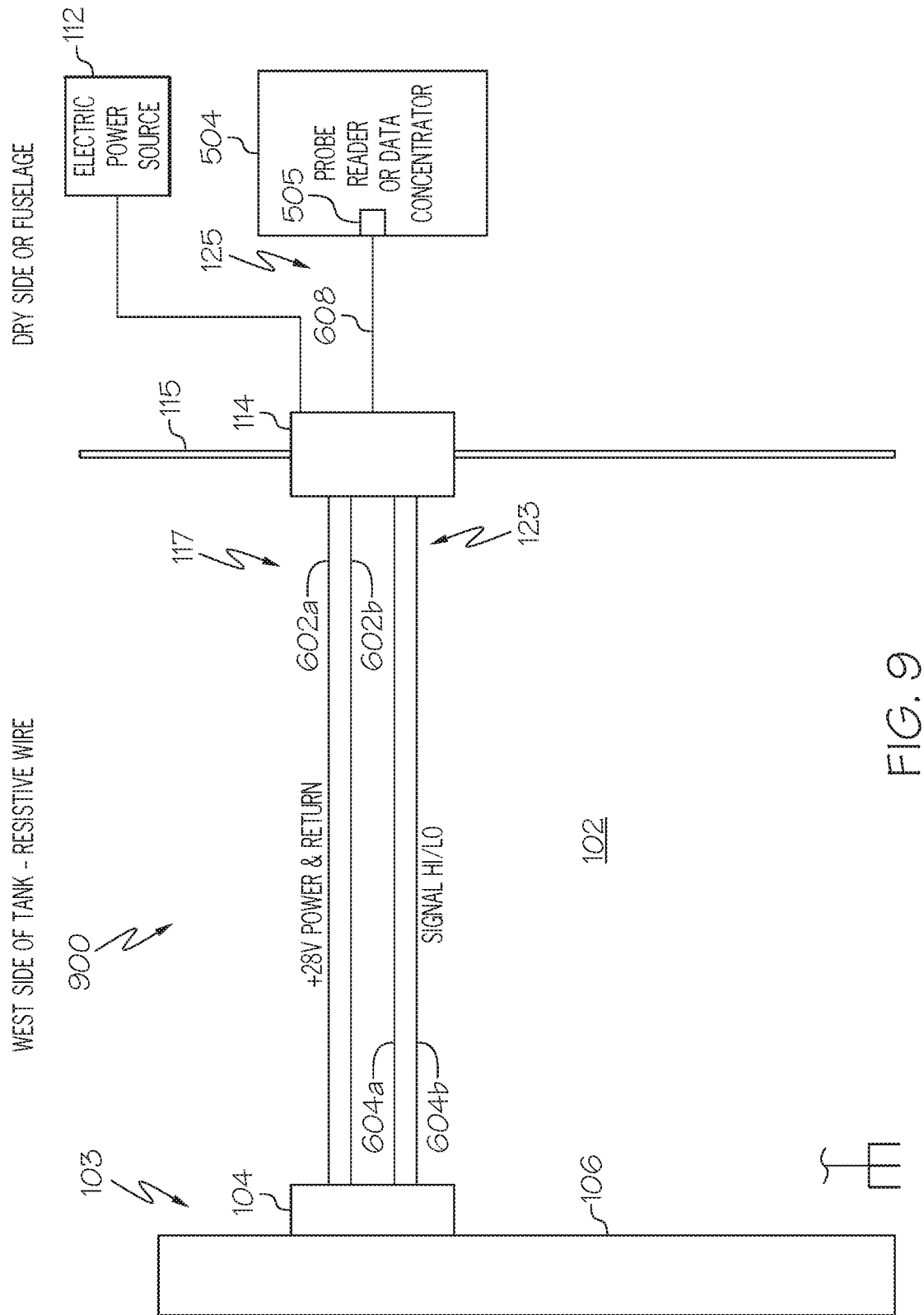

FIG. 9 illustrates an example of a four wire architecture 900 including a floating fuel height probe 106, i.e., the fuel height probe 106 is not grounded. An electric power connection 117 within the fuel tank 102 includes a power resistive non-metallic wire 602a and a return power resistive non-metallic wire 602b connecting the probe electronics package 104 to the sealed connector 114. An internal data communications connection 123 within the fuel tank 102 includes a signal Hi resistive non-metallic wire 604a and a signal Lo resistive non-metallic wire 604b connecting the probe electronics package 104 to the sealed connector 114. The resistive non-metallic wires 602a, 602b, 604a and 604b are the same as resistive non-metallic wires 116 in FIG. 1A. The sealed connector 114 is electrically connected to a probe reader 504 by an external data communications connection 125. In accordance with an example, the external data communications connection 125 includes a copper bundle 608. In another embodiment, the probe reader 504 is replaced by a data concentrator.

Figure 10:
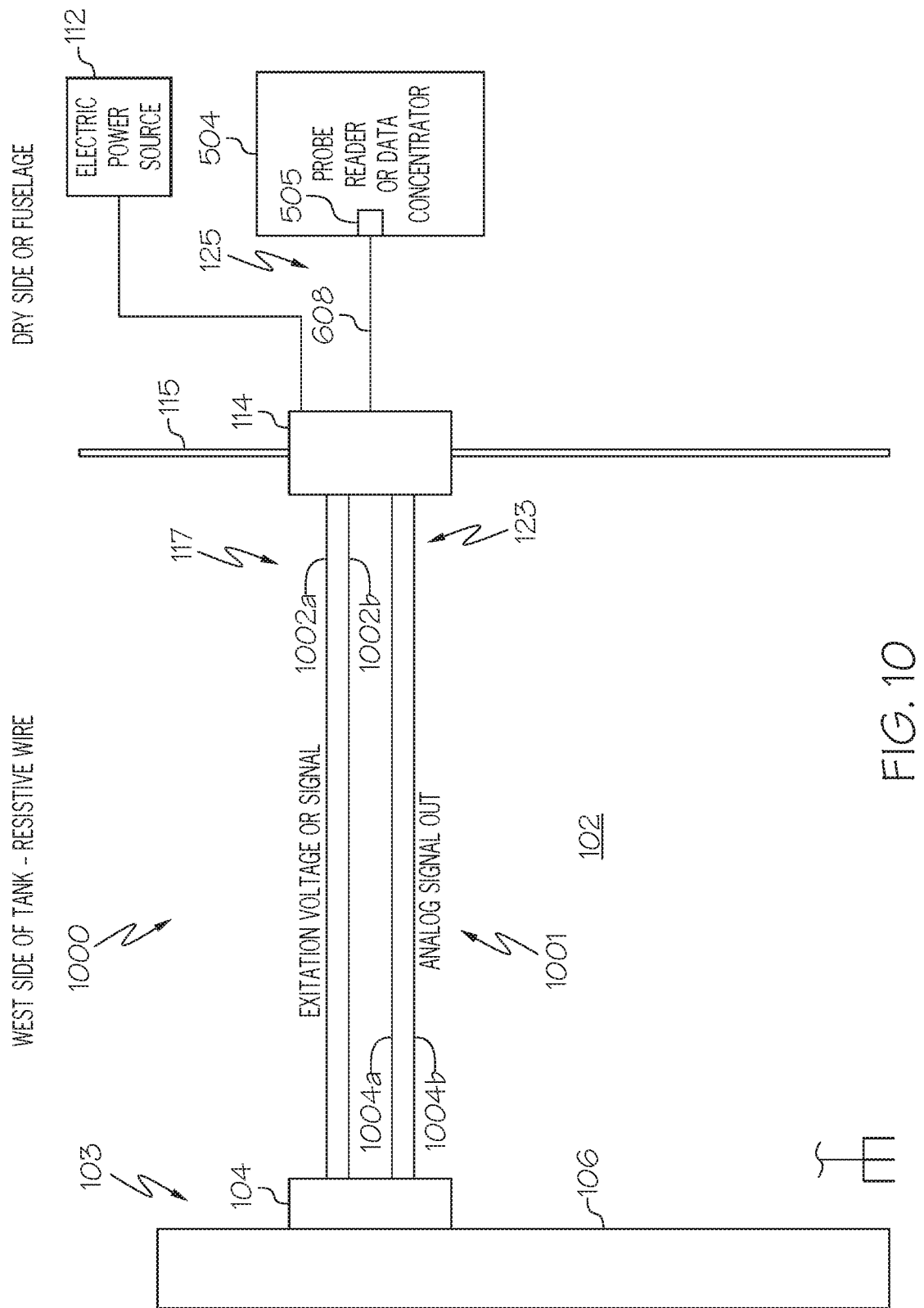

FIG. 10 illustrates an example of a four wire architecture 1000 including an analog signal out connection 1001 and a floating fuel height probe 106, i.e., the probe 106 is not grounded. An electric power connection 117 within the fuel tank 102 includes an excitation voltage resistive non-metallic wire 1002a and a return resistive non-metallic wire 1002b connecting the probe electronics package 104 to the sealed connector 114. An internal data communications connection 123 within the fuel tank 102 includes a pair of analog signal out resistive non-metallic wires 1004a and 1004b connecting the probe electronics package 104 to the sealed connector 114. The resistive non-metallic wires 1002a, 1002b, 1004a and 1004b are the same as resistive non-metallic wires 116 in FIG. 1A. The internal data communications connection 123 includes the analog signal out connection 1001. The sealed connector 114 is electrically connected to a probe reader 504 by an external data communications connection 125. In accordance with an example, the external data communications connection 125 includes a copper bundle 608. In another embodiment, the probe reader 504 is replaced by a data concentrator.

Figure 11:
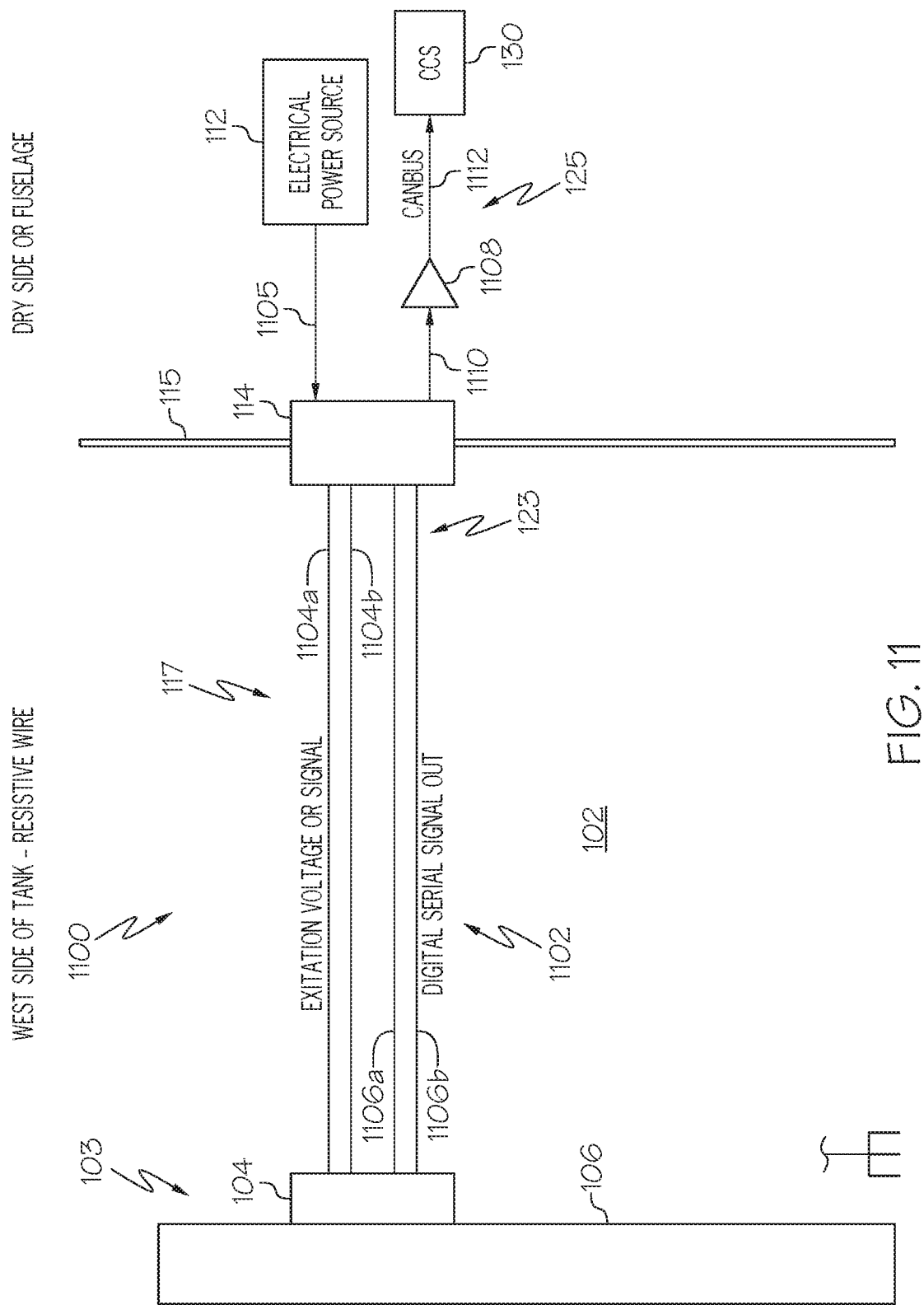

FIG. 11 illustrates an example of a four wire architecture 1100 including a digital signal out connection 1102 from the probe electronics package 104 and a floating fuel height probe 106 (no ground). In accordance with the example illustrated in FIG. 11, an electric power connection 117 within the fuel tank 102 includes an excitation voltage resistive non-metallic wire 1104a and a return resistive non-metallic wire 1104b connecting the probe electronics package 104 to the sealed connector 114. An electric power source 112 outside the fuel tank 102 is connected to the sealed connector 114 by a copper wire 1105. An internal data communications connection 123 within the fuel tank 102 includes a pair of digital signal out resistive non-metallic wires 1106a and 1106b. The resistive non-metallic wires 1104a, 1104b, 1106a and 1106b are the same as resistive non-metallic wires 116 in FIG. 1A. The internal data communications connection 123 includes the digital signal out connection 1102. An external data communications connection 125 electrically connects the sealed connector 114 to a CCS 130. In the example illustrated in FIG. 11, the external data communications connection 125 includes a canbus 1112, digital data bus or ARINC bus. The sealed connector 114 transmits the digital signal out 1102 to an amplifier 1108 outside the fuel tank 102 via a copper wire 1110. In accordance with another embodiment, the amplifier 1108 is replaced by a canbus buffer. The digital signal out 1102 is transmitted from the canbus buffer or amplifier 1108 by a canbus 1112, digital data bus or ARINC bus to the CCS 130.

Figure 12:
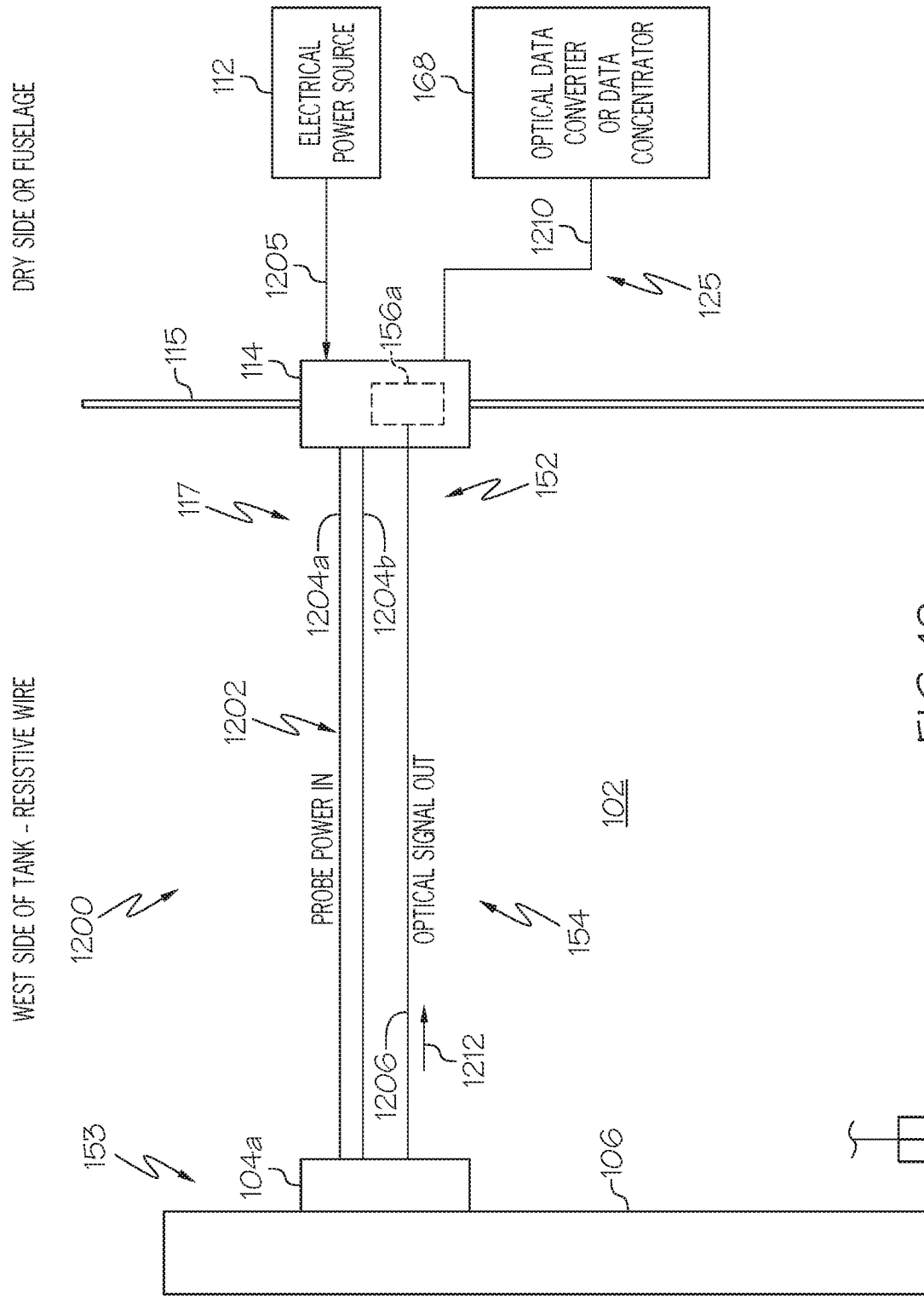
FIGS. 12, 13A and 13B are examples of electric power and data communications configurations within a fuel tank including an optical hybrid fuel height sensor and optical signal out connection in accordance with different embodiments of the present disclosure

FIG. 12 is an example of an electrical power and data communications configuration 1200 within a fuel tank 102 including an optical hybrid fuel height sensor 153 and optical signal out connection 154, as described with reference to FIGS. 1B and 1C. The electrical power and data communications configuration 1200 includes a four wire architecture 1202 including a combination optical and resistive communications connection configuration and floating fuel height probe 106, i.e., the fuel height probe 106 is not connected to ground as illustrated in FIG. 12. In accordance with an exemplary embodiment, the system 100a in FIG. 1B includes the electrical power and data communications configuration 1200 in FIG. 12. In accordance with another embodiment, the system 100b in FIG. 1C includes the electric power and data communications configuration 1200 in FIG. 12. In accordance with the example illustrated in FIG. 12, an electric power connection 117 in the fuel tank 102 includes a probe power in resistive non-metallic wire 1204a and a return power resistive non-metallic wire 1204b connecting the probe electronics package 104a to the sealed connector 114. An electric power source 112 outside the fuel tank 102 is connected to the sealed connector 114 by a copper wire 1205. An internal data communications connection 152 within the fuel tank 102 includes an optical signal out connection 154 (fiber optic cable connection) that transmits a light emitting diode (LED) signal 1212 to the optical connector 156a within the sealed connector 114 or to the dedicated sealed optical connector 156 in the exemplary embodiment in FIG. 1B. The optical connector 156a within the sealed connector 114 or sealed optical connector 156 (FIG. 1B) is connected to an optical data converter 168 outside the fuel tank 102 by an external data communications connection 125. In accordance with an example, the external data communications connection 125 includes a fiber optic cable 1210. In accordance with another example, the optical data converter 168 is replaced by a data concentrator.

Figure 13A:
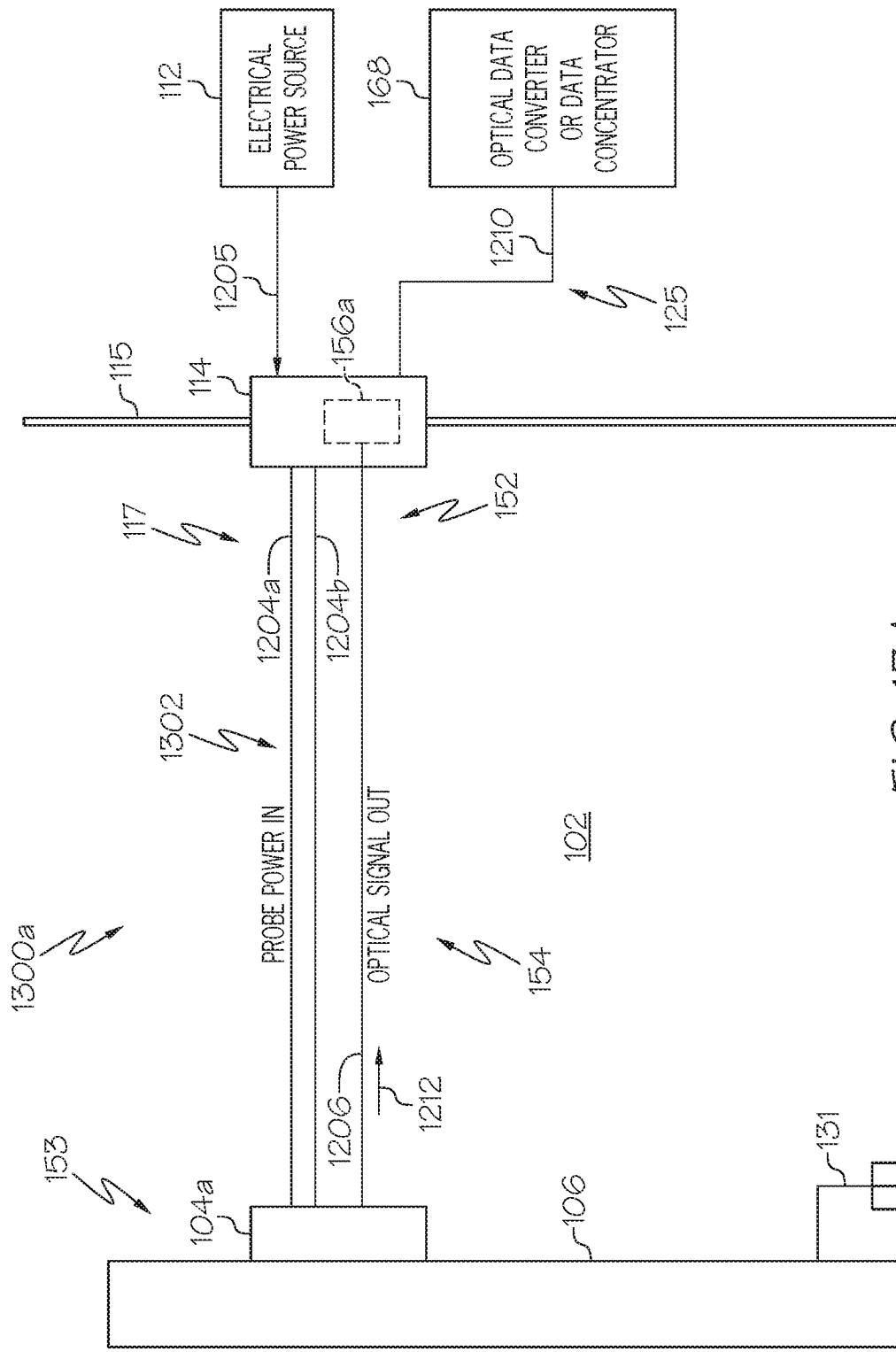

FIG. 13A is an example of an electric power and data communications configuration 1300a within a fuel tank 102 including an optical hybrid fuel height sensor 153 and optical signal out connection 154 in accordance with an embodiment of the present disclosure. The electric power and data communications configuration 1300a includes a four wire architecture 1302 including a combination resistive non-metallic electric power connection 117, optical signal out connection 154 and a fuel height probe 106 with a local electric ground connection 131. In accordance with an exemplary embodiment, the system 100a in FIG. 1B includes the electric power and data communications configuration 1300a in FIG. 13A. In accordance with another embodiment, the system 100b in FIG. 1C includes the electric power and data communications configuration 1300a in FIG. 13A. In accordance with the example illustrated in FIG. 13A, an electric power connection 117 within the fuel tank 102 includes a probe power in resistive non-metallic wire 1204a and a return power resistive non-metallic wire 1204b connecting the probe electronics package 104a to the sealed connector 114. An electric power source 112 outside the fuel tank 102 is connected to the sealed connector 114 by a copper wire 1205. An internal data communications connection 152 within the fuel tank 102 includes an optical signal out connection 154 (fiber optic cable connection) that transmits a light emitting diode (LED) signal 1212 to the optical connector 156a within the sealed connector 114 or to dedicated sealed optical connector 156 (FIG. 1B). The optical connector 156a within the sealed connector 114 is connected to an optical data converter 168 outside the fuel tank 102 by an external data communications connection 125. The external data communications connection 125 includes a fiber optic cable 1210 in accordance with an example. In another example, the optical data converter 168 is replaced a data concentrator.

Figure 13B:
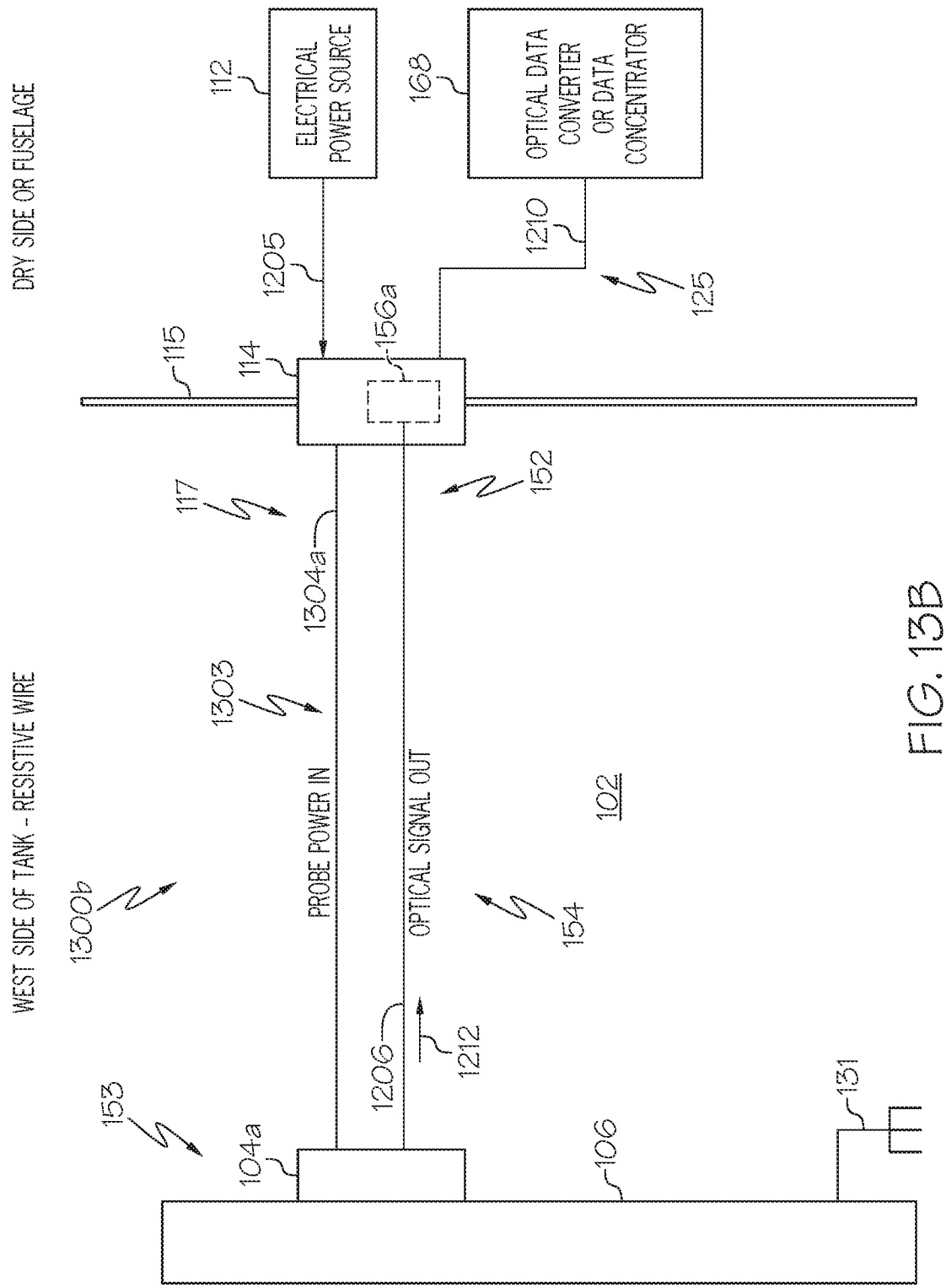

FIG. 13B is an example of an electric power and data communications configuration 1300b within a fuel tank 102 including an optical hybrid fuel height sensor 153 and optical signal out connection 154 in accordance with a further embodiment of the present disclosure. The electric power and data communications configuration 1300b includes a four wire architecture 1303 including a combination resistive non-metallic electric power connection 117 and optical signal out connection 154 and a fuel height probe 106 with a local electric ground connection 131. The electric power connection 117 and optical signal out connection 154 are similar to FIG. 13A except the local electric ground connection 131 provides an electric current return path via a structural ground rather than a wire return path as illustrated in the example in FIG. 13A.

Figure 14:
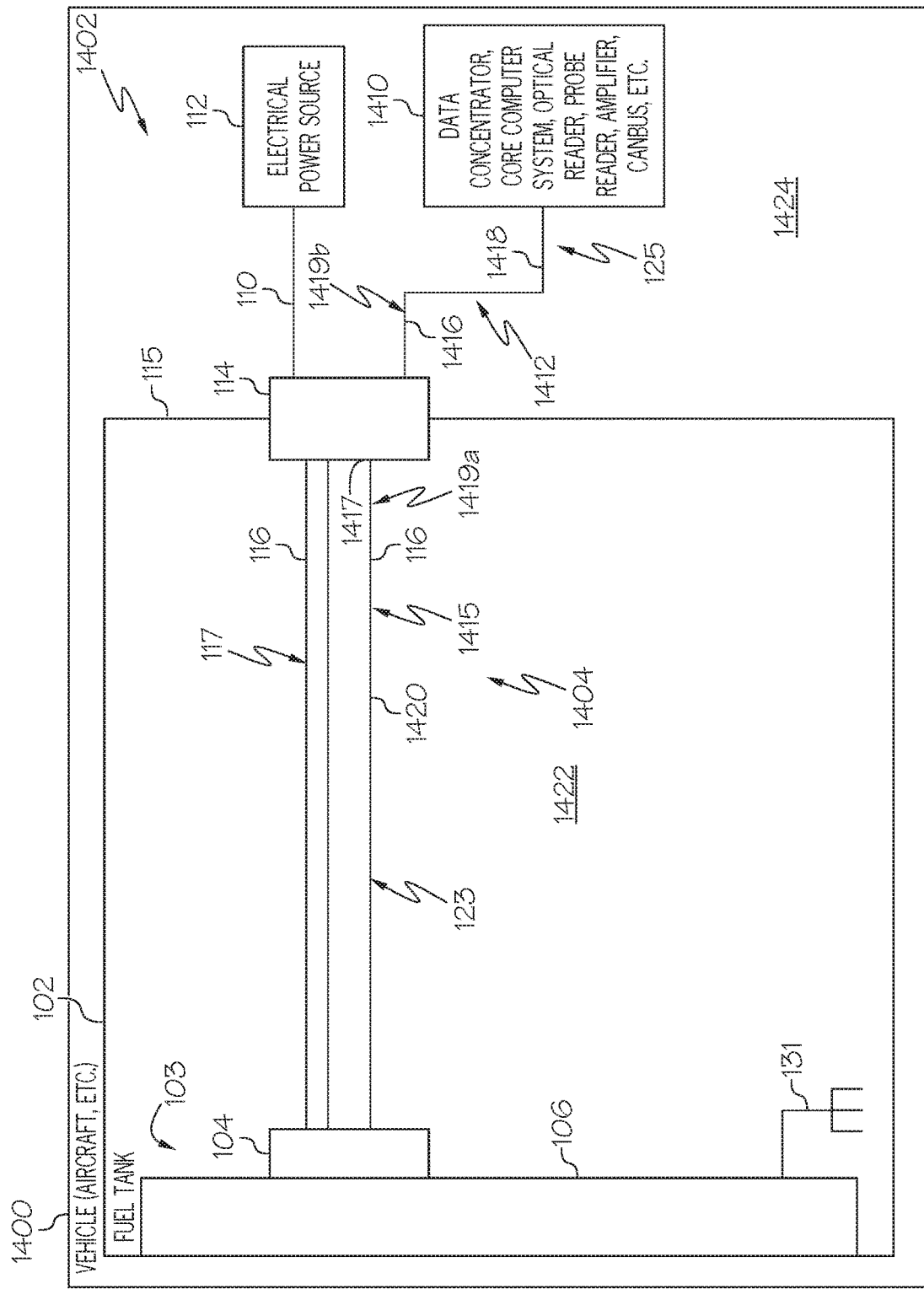
FIG. 14 is an example of a vehicle including a system for power and data communications within a fuel tank and across a wall of the fuel tank in accordance with an embodiment of the present disclosure.

FIG. 14 is an example of a vehicle 1400 including a system 1402 for power and data communications within a fuel tank 102 and across a wall 115 of the fuel tank 102 in accordance with an embodiment of the present disclosure. In accordance with one or more embodiments, the system 1402 for power and data communications is the same or similar to the exemplary system 100 in FIG. 1A and includes any of the different embodiments described with reference to FIGS. 1-13. In accordance with an example, the vehicle 1400 is an aircraft. The vehicle 1400 includes a fuel tank 102. The fuel tank 102 includes a power and data communications systems 1404. The power and data communications system 1404 includes a fuel height probe 106 and a sealed connector 114 extending through a wall 115 of the fuel tank 102. The sealed connector 114 includes an internal electronic circuit 302 (FIG. 3). The power and data communications system 1404 also includes an electric power connection 117 between the fuel height probe 106 and the sealed connector 114. The power and data communications system 1404 additionally includes an internal data communications connection 123 between the probe electronics package 104 of the fuel height sensor 103 and the sealed connector 114. At least the electric power connection 117 between the probe electronics package 104 and the sealed connector 114 includes a resistive non-metallic wire 116.

The vehicle 1400 also includes a device 1410 outside the fuel tank 102. The devices 1410 is at least one of a data concentrator, a core computer system, an optical reader, a probe reader, an amplifier, or a canbus. The device 1410 is connected to the sealed connector 114 by an external data communications connection 125. In accordance with another embodiment, the device 1410 includes a data connection 1412 between the sealed connector 114 and the device 1410.

The device 1410 or data concentrator is communicatively coupled to the fuel height sensor 103 through a resistive non-metallic wire 116 on at least one portion 1415 of a communications link 1416 between the fuel height sensor 103 and the sealed connector 114. An input 1417 of the sealed connector 114 is configured to receive data from the fuel height sensor 103 over the resistive non-metallic wire 116 on the at least one portion 1415 of the of the communications link 1416. The resistive non-metallic wire 116 is internal to the fuel tank 102.

In accordance with an embodiment, the device 1410 or data concentrator is communicatively coupled to the fuel height probe 106 through a first wire 1418 and a second wire 1420, wherein the first wire 1418 and the second wire 1420 have different electrical properties. The first wire 1418 and the second wire 1420 are each in a different environment. One environment is a wet environment 1422 and the other environment is a dry environment 1424.

In accordance with an embodiment, the device 1410 or data concentrator is communicatively coupled to the fuel height probe 106 over a communications link 1416 that includes two or more segments 1419, wherein a first segment 1419a is over a resistive non-metallic wire and a second segment 1419b is over a metallic wire.

In accordance with an embodiment, the device 1410 or data concentrator further includes an output configured to transmit data based on the data received from the fuel height sensor 103 to a fuel management system 134 embodied on a core computer system, such as core computer system (CCS) 130 in FIG. 1A, configured to convey a fuel quantity indication based on the data received from the fuel height sensor 103.

Figure 15:
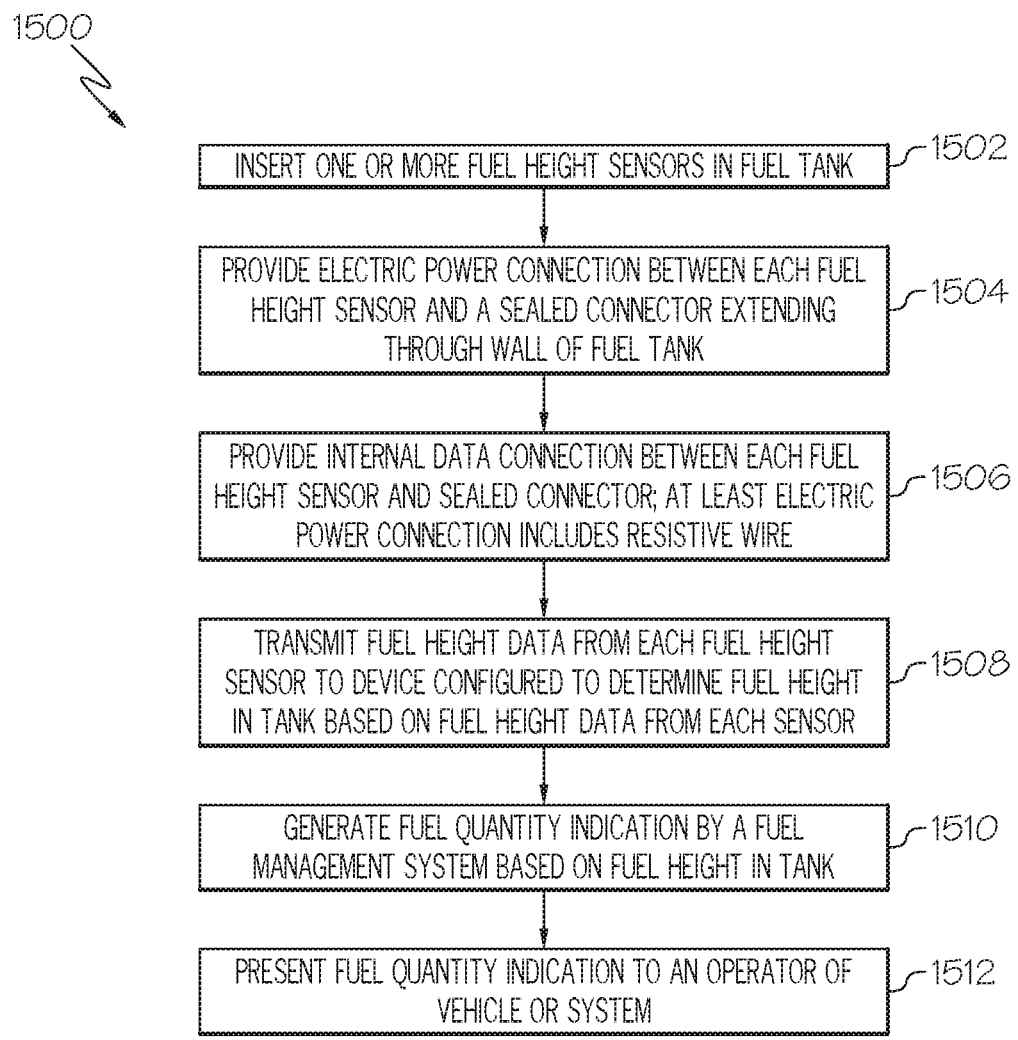
FIG. 15 is a flow chart of an example of a method for monitoring a quantity of fuel in a fuel tank in accordance with an embodiment of the present disclosure.

FIG. 15 is a flow chart of an example of a method 1500 for monitoring a quantity of fuel in a fuel tank 102 in accordance with an embodiment of the present disclosure. In block 1502, one or more fuel height sensors are inserted into a fuel tank 102. In accordance with an example, the fuel height sensors are similar to the fuel height sensors 103 described with reference to FIG. 1A. In accordance with another embodiment, the fuel height sensors 103 are replaced by optical hybrid fuel height sensors 153 in FIG. 1B or FIG. 1C.

In block 1504, an electric power connection 117 is provided between each fuel height sensor 103 and a sealed connector 114 extending through a wall 115 of the fuel tank 102. The electric power connection 117 includes any of the electric power connections previously described and the sealed connector 114 is similar to sealed connector 114.

In block 1506, an internal data communications connection 123 is provided between each fuel height sensor 103 and the sealed connector 114. The internal data communications connection 123 includes any of the internal data communications connection 123 embodiments previously described.

In block 1508, fuel height data is transmitted from each fuel height sensor 103 to a device configured to determine the fuel height in the fuel tank based on the fuel height data from each fuel height sensor. In accordance with an example, the device incudes a fuel management system 134 embodied on a CCS 130.

In block 1510, a fuel quantity indication is generated by the fuel management system 134 based on the fuel height in the fuel tank 102. In block 1512, the fuel quantity indication is presented to an operator of the vehicle 129 or system, for example, via most any human-machine interface (HMI).

Although the above embodiments have been described with respect to an aircraft, the embodiments and features described herein are not limited to an aircraft and can be implemented in other vehicles, such as land vehicles and watercraft.

Further, the disclosure comprises embodiments according to the following clauses:

Clause 1. A system, comprising:
an optical hybrid fuel height sensor;
a sealed connector extending through a wall of a fuel tank;
an electric power connection between the optical hybrid fuel height sensor and the sealed connector, wherein the electric power connection comprises a resistive non-metallic wire;
a sealed optical connector extending through the wall of the fuel tank; and
an internal data communications connection between the optical hybrid fuel height sensor and the sealed optical connector, the internal data communications connection comprising an optical signal out connection.

Clause 2. The system of clause 1, wherein the resistive non-metallic wire comprises a carbon loaded thermoplastic.

Clause 3. The system of any of clauses 1 or 2, wherein the resistive non-metallic wire comprises a carbon loaded polyether ether ketone (PEEK) thermoplastic.

Clause 4. The system of any of clauses 1-2, or 3, wherein the resistive non-metallic wire comprises a resistance between about 100 ohms/meter and about 1 Mohms/meter.

Clause 5. The system of any of clauses 1-3, or 4, wherein the optical hybrid fuel height sensor comprises an optical transmitter configured to convert fuel height electrical signals to fuel height optical signals.

Clause 6. The system of any of clauses 1-4, or 5, wherein the internal data communications connection comprises an optical fiber that couples the optical transmitter and the sealed optical connector.

Clause 7. The system of any of clauses 1-5, or 6, wherein the sealed optical connector comprises an optical connector disposed within the sealed connector and the optical connector connects the internal data communications connection to an external data communications connection.

Clause 8. The system of any of clauses 1-6, or 7, wherein the sealed optical connector comprises a dedicated sealed optical connector that is separate from the sealed connector and connects the internal data communications connection to an external data communications connection.

Clause 9. The system of any of clauses 1-7, or 8, wherein the sealed optical connector comprises an optical fiber that extends intact through the wall of the fuel tank and between the optical transmitter and an optical data converter, or a data concentrator, outside the fuel tank.

Clause 10. The system of any of clauses 1-8, or 9, further comprising an external data communications connection outside the fuel tank between the sealed optical connector and a device of a core computer system (CCS).

Clause 11. The system of any of clauses 1-9, or 10, wherein the external data communications connection comprises an optical data converter connected between the sealed optical connector and the CCS, the optical data converter being configured to convert optical signals to electrical signals for transmission on a conductive metal wire to the CCS.

Clause 12. The system of any of clauses 1-10, or 11, wherein the external data communications connection comprises a data concentrator connected between the sealed optical connector and the CCS, the data concentrator being configured to read a multitude of fiber optic signals and transmit a single stream of data to the CCS.

Clause 13. The system of any of clauses 1-11, or 12, wherein the electric power connection comprises a two-wire electric power connection.

Clause 14. The system of any of clauses 1-12, or 13, wherein the electric power connection comprises a one-wire electric power connection and a current return through a local ground connection of the optical hybrid fuel height sensor.

Clause 15. The system of any of clauses 1-13, or 14, wherein the optical hybrid fuel height sensor comprises a fuel height probe and the fuel height probe comprises a local electric ground connection.

Clause 16. The system of any of clauses 1-14, or 15, wherein the optical hybrid fuel height sensor comprises a floating fuel height probe without an electric ground connection.

Clause 17. A vehicle, comprising:
a fuel tank; and
a power and data communications system within the fuel tank, the power and data communications system comprising
an optical hybrid fuel height sensor;
a sealed connector extending through a wall of the fuel tank;
an electric power connection between the optical hybrid fuel height sensor and the sealed connector, wherein the electric power connection comprises a resistive non-metallic wire;
a sealed optical connector extending through the wall of the fuel tank; and
an internal data communications connection between the optical hybrid fuel height sensor and the sealed optical connector, the internal data communications connection comprising an optical signal out connection.

Clause 18. The vehicle of clause 17, wherein the resistive non-metallic wire comprises a carbon loaded thermoplastic.

Clause 19. The vehicle of any of clauses 17 or 18, wherein the resistive non-metallic wire comprises a carbon loaded polyether ether ketone (PEEK) thermoplastic.

Clause 20. The vehicle of any of clauses 17-18, or 19, wherein the resistive non-metallic wire comprises a resistance between about 100 ohms/meter and about 1 Mohms/meter.

Clause 21. The vehicle of any of clauses 17-19, or 20, wherein the optical hybrid fuel height sensor comprises an optical transmitter configured to convert fuel height electrical signals to fuel height optical signals.

Clause 22. The vehicle of any of clauses 17-20, or 21, wherein the internal data communications connection comprises an optical fiber that couples the optical transmitter and the sealed optical connector.

Clause 23. The vehicle of any of clauses 17-21, or 22, wherein the sealed optical connector comprises an optical connector disposed within the sealed connector and the optical connector connects the internal data communications connection to an external data communications connection.

Clause 24. The vehicle of any of clauses 17-22, or 23, wherein the sealed optical connector comprises a dedicated sealed optical connector that is separate from the sealed connector and connects the internal data communications connection to an external data communications connection.

Clause 25. The vehicle of any of clauses 17-23, or 24, wherein the sealed optical connector comprises an optical fiber that extends intact through the wall of the fuel tank and between the optical transmitter and an optical data converter, or a data concentrator, outside the fuel tank.

Clause 26. The vehicle of any of clauses 17-24, or 25, further comprising an external data communications connection outside the fuel tank between the sealed optical connector and a device of a core computer system (CCS).

Clause 27. The vehicle of any of clauses 17-25, or 26, wherein the external data communications connection comprises an optical data converter connected between the sealed optical connector and the CCS, the optical data converter being configured to convert optical signals to electrical signals for transmission on a conductive metal wire to the CCS.

Clause 28. The vehicle of any of clauses 17-26, or 27, wherein the external data communications connection comprises a data concentrator connected between the sealed optical connector and the CCS, the data concentrator being configured to read a multitude of fiber optic signals and transmit a single stream of data to the CCS.

Clause 29. The vehicle of any of clauses 17-27, or 28, wherein the electric power connection comprises a two-wire electric power connection.

Clause 30. The vehicle of any of clauses 17-28, or 29, wherein the electric power connection comprises a one-wire electric power connection and a current return through a local ground connection of the optical hybrid fuel height sensor.

Clause 31. The vehicle of any of clauses 17-29, or 30, wherein the optical hybrid fuel height sensor comprises a fuel height probe and the fuel height probe comprises a local electric ground connection.

Clause 32. The vehicle of any of clauses 17-30, or 31, wherein the optical hybrid fuel height sensor comprises a floating fuel height probe without an electric ground connection.

Clause 33. A method, comprising:
  inserting one or more optical hybrid fuel height sensors in a fuel tank;
  providing an electric power connection between each optical hybrid fuel height sensor and a sealed connector extending through a wall of the fuel tank;
  providing a sealed optical connector extending through the wall of the fuel tank; and
  providing an internal data communications connection between each optical hybrid fuel height sensor and the sealed optical connector, the internal data communications connection comprising an optical signal out connection.

Clause 34. The method of clause 33, wherein the electric power connection comprises a resistive non-metallic wire.

Clause 35. The method of any of clause 33 or clause 34, wherein the resistive non-metallic wire comprises a carbon loaded thermoplastic.

Clause 36. The method of any of clauses 33-34 or 35, wherein the resistive non-metallic wire comprises a carbon loaded polyether ether ketone (PEEK) thermoplastic.

Clause 37. The method of any of clauses 33-35, or 36, wherein the resistive non-metallic wire comprises a resistance between about 100 ohms/meter and about 1 Mohms/meter.

Clause 38. The method of any of clauses 33-36, or 37, wherein the optical hybrid fuel height sensor comprises an optical transmitter configured to convert fuel height electrical signals to fuel height optical signals.

Clause 39. The method of any of clauses 33-37, or 38, wherein the internal data communications connection comprises an optical fiber that couples the optical transmitter and the sealed optical connector.

Clause 40. The method of any of clauses 33-38, or 39, wherein the sealed optical connector comprises an optical connector disposed within the sealed connector and the optical connector connects the internal data communications connection to an external data communications connection.

Clause 41. The method of any of clauses 33-39, or 40, wherein the sealed optical connector comprises a dedicated sealed optical connector that is separate from the sealed connector and connects the internal data communications connection to an external data communications connection.

Clause 42. The method of any of clauses 33-40, or 41, wherein the sealed optical connector comprises an optical fiber that extends intact through the wall of the fuel tank and between the optical transmitter and an optical data converter, or a data concentrator, outside the fuel tank.

Clause 43. The method of any of clauses 33-41, or 42, further comprising an external data communications connection outside the fuel tank between the sealed optical connector and a device of a core computer system (CCS).

Clause 44. The method of any of clauses 33-42, or 43, wherein the external data communications connection comprises an optical data converter connected between the sealed optical connector and the CCS, the optical data converter being configured to convert optical signals to electrical signals for transmission on a conductive metal wire to the CCS.

Clause 45. The method of any of clauses 33-43, or 44, wherein the external data communications connection comprises a data concentrator connected between the sealed optical connector and the CCS, the data concentrator being configured to read a multitude of fiber optic signals and transmit a single stream of data to the CCS.

Clause 46. The method of any of clauses 33-44, or 45, wherein the electric power connection comprises a two-wire electric power connection.

Clause 47. The method of any of clauses 33-45, or 46, wherein the electric power connection comprises a one-wire electric power connection and a current return through a local ground connection of the optical hybrid fuel height sensor.

Clause 48. The method of any of clauses 33-46, or 47, wherein the optical hybrid fuel height sensor comprises a fuel height probe and the fuel height probe comprises a local electric ground connection.

Clause 49. The method of any of clauses 33-47, or 48, wherein the optical hybrid fuel height sensor comprises a floating fuel height probe without an electric ground connection.

Clause 50. A data concentrator, comprising
an interface configured to receive data from a system for electric power and data communications within a fuel tank and across a wall of the fuel tank, the system comprises:
an optical hybrid fuel height sensor;
a sealed connector extending through the wall of a fuel tank;
an electric power connection between the optical hybrid fuel height sensor and the sealed connector, wherein the electric power connection comprises a resistive non-metallic wire;
a sealed optical connector extending through the wall of the fuel tank; and
an internal data communications connection between the optical hybrid fuel height sensor and the sealed optical connector, the internal data communications connection comprising an optical signal out connection.

Clause 51. The data concentrator of clause 50, wherein the resistive non-metallic wire comprises a carbon loaded thermoplastic.

Clause 52. The data concentrator of any of clauses 50 or 51, wherein the resistive non-metallic wire comprises a carbon loaded polyether ether ketone (PEEK) thermoplastic.

Clause 53. The data concentrator of any of clauses 50-51, or 52, wherein the resistive non-metallic wire comprises a resistance between about 100 ohms/meter and about 1 Mohms/meter.

Clause 54. The data concentrator of any of clauses 50-52, or 53, wherein the optical hybrid fuel height sensor comprises an optical transmitter configured to convert fuel height electrical signals to fuel height optical signals.

Clause 55. The data concentrator of any of clauses 50-53, or 54, wherein the internal data communications connection comprises an optical fiber that couples the optical transmitter and the sealed optical connector.

Clause 56. The data concentrator of any of clauses 50-54, or 55, wherein the sealed optical connector comprises an optical connector disposed within the sealed connector and the optical connector connects the internal data communications connection to an external data communications connection.

Clause 57. The data concentrator of any of clauses 50-55, or 56, wherein the sealed optical connector comprises a dedicated sealed optical connector that is separate from the sealed connector and connects the internal data communications connection to an external data communications connection.

Clause 58. The data concentrator of any of clauses 50-56, or 57, wherein the sealed optical connector comprises an optical fiber that extends intact through the wall of the fuel tank and between the optical transmitter and an optical data converter, or the data concentrator, outside the fuel tank.

Clause 59. The data concentrator of any of clauses 50-57, or 58, further comprising an external data communications connection outside the fuel tank between the sealed optical connector and a device of a core computer system (CCS).

Clause 60. The data concentrator of any of clauses 50-58, or 59, wherein the external data communications connection comprises an optical data converter connected between the sealed optical connector and the CCS, the optical data converter being configured to convert optical signals to electrical signals for transmission on a conductive metal wire to the CCS.

Clause 61. The data concentrator of any of clauses 50-59, or 60, wherein the external data communications connection comprises the data concentrator connected between the sealed optical connector and the CCS, the data concentrator being configured to read a multitude of fiber optic signals and transmit a single stream of data to the CCS.

Clause 62. The data concentrator of any of clauses 50-60, or 61, wherein the electric power connection comprises a two-wire electric power connection.

Clause 63. The system of any of clauses 50-61, or 62, wherein the electric power connection comprises a one-wire electric power connection and a current return through a local ground connection of the optical hybrid fuel height sensor.

Clause 64. The data concentrator of any of clauses 50-62, or 63, wherein the optical hybrid fuel height sensor comprises a fuel height probe and the fuel height probe comprises a local electric ground connection.

Clause 65. The data concentrator of any of clauses 50-63, or 64, wherein the optical hybrid fuel height sensor comprises a floating fuel height probe without an electric ground connection.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A system, comprising:
    an optical hybrid fuel height sensor;
    a sealed connector extending through a wall of a fuel tank;
    an electric power connection between the optical hybrid fuel height sensor and the sealed connector, wherein the electric power connection comprises a resistive non-metallic wire, wherein the resistive non-metallic wire comprises a resistance between about 100 ohms/meter and about 1 Mohms/meter;
    a sealed optical connector extending through the wall of the fuel tank; and
    an internal data communications connection between the optical hybrid fuel height sensor and the sealed optical connector, the internal data communications connection comprising an optical signal out connection.

2. The system of claim 1, wherein the resistive non-metallic wire comprises a carbon loaded thermoplastic.

3. The system of claim 1, wherein the resistive non-metallic wire comprises a carbon loaded polyether ether ketone (PEEK) thermoplastic.

4. The system of claim 1, wherein the optical hybrid fuel height sensor comprises an optical transmitter configured to convert fuel height electrical signals to fuel height optical signals.

5. The system of claim 4, wherein the internal data communications connection comprises an optical fiber that couples the optical transmitter and the sealed optical connector.

6. The system of claim 5, wherein the sealed optical connector comprises an optical connector disposed within the sealed connector and the optical connector connects the internal data communications connection to an external data communications connection.

7. The system of claim 4, wherein the sealed optical connector comprises a dedicated sealed optical connector that is separate from the sealed connector and connects the internal data communications connection to an external data communications connection.

8. The system of claim 4, wherein the sealed optical connector comprises an optical fiber that extends intact through the wall of the fuel tank and between the optical transmitter and an optical data converter, or a data concentrator, outside the fuel tank.

9. The system of claim 1, further comprising an external data communications connection outside the fuel tank between the sealed optical connector and a device of a core computer system (CCS).

10. The system of claim 9, wherein the external data communications connection comprises an optical data converter connected between the sealed optical connector and the CCS, the optical data converter being configured to convert optical signals to electrical signals for transmission on a conductive metal wire to the CCS.

11. The system of claim 9, wherein the external data communications connection comprises a data concentrator connected between the sealed optical connector and the CCS, the data concentrator being configured to read a multitude of fiber optic signals and transmit a single stream of data to the CCS.

12. The system of claim 1, wherein the electric power connection comprises a two-wire electric power connection.

13. The system of claim 1, wherein the electric power connection comprises a one-wire electric power connection and a current return through a local ground connection of the optical hybrid fuel height sensor.

14. The system of claim 1, wherein the optical hybrid fuel height sensor comprises a fuel height probe and the fuel height probe comprises a local electric ground connection.

15. The system of claim 1, wherein the optical hybrid fuel height sensor comprises a floating fuel height probe without an electric ground connection.

16. A vehicle, comprising:
    a fuel tank; and
    a power and data communications system within the fuel tank, the power and data communications system comprising:
    an optical hybrid fuel height sensor;
    a sealed connector extending through a wall of the fuel tank;
    an electric power connection between the optical hybrid fuel height sensor and the sealed connector, wherein the electric power connection comprises a resistive non-metallic wire;
    a sealed optical connector extending through the wall of the fuel tank;
    an internal data communications connection between the optical hybrid fuel height sensor and the sealed optical connector, the internal data communications connection comprising an optical signal out connection; and
    an external data communications connection outside the fuel tank between the sealed optical connector and a device configured to calculate a volume of fuel in the fuel tank, wherein the external data communications connection comprises an optical data converter or a data concentrator connected between the sealed optical connector and the device.

17. The vehicle of claim 16, wherein the optical hybrid fuel height sensor comprises an optical transmitter configured to convert fuel height electrical signals to fuel height optical signals and the internal data communications connection comprises an optical fiber that couples the optical transmitter and the sealed optical connector.

18. The vehicle of claim 17, wherein the sealed connector comprises the sealed optical connector that connects the internal data communications connection to an external data communications connection.

19. The system of claim 17, wherein the sealed optical connector comprises a dedicated sealed optical connector that is separate from the sealed connector and connects the internal data communications connection to an external data communications connection.

20. A method, comprising:
    inserting one or more optical hybrid fuel height sensors in a fuel tank;
    providing an electric power connection between each optical hybrid fuel height sensor and a sealed connector extending through a wall of the fuel tank;
    providing a sealed optical connector extending through the wall of the fuel tank; and providing an internal data communications connection between each optical hybrid fuel height sensor and the sealed optical connector, the internal data communications connection comprising an optical signal out connection; and providing an external data communications connection outside the fuel tank between the sealed optical connector and a device configured to calculate a volume of fuel in the fuel tank, wherein the external data communications connection comprises an optical data converter or a data concentrator connected between the sealed optical connector and the device.

21. A data concentrator, comprising
an interface configured to receive data from a system for electric power and data communications within a fuel tank and across a wall of the fuel tank, the system comprises:
an optical hybrid fuel height sensor;
a sealed connector extending through the wall of a fuel tank;
an electric power connection between the optical hybrid fuel height sensor and the sealed connector, wherein the electric power connection comprises a resistive non-metallic wire;
a sealed optical connector extending through the wall of the fuel tank; and
an internal data communications connection between the optical hybrid fuel height sensor and the sealed optical connector, the internal data communications connection comprising an optical signal out connection.

22. A system, comprising:
an optical hybrid fuel height sensor;
a sealed connector extending through a wall of a fuel tank;
an electric power connection between the optical hybrid fuel height sensor and the sealed connector, wherein the electric power connection comprises a resistive non-metallic wire;
a sealed optical connector extending through the wall of the fuel tank;
an internal data communications connection between the optical hybrid fuel height sensor and the sealed optical connector, the internal data communications connection comprising an optical signal out connection; and
an external data communications connection outside the fuel tank between the sealed optical connector and a device configured to determine at least a quantity of fuel in the fuel tank, wherein the external data communications connection comprises an optical data converter or a data concentrator connected between the sealed optical connector and the device.

* * * * *